US012595441B2

(12) United States Patent
Jackson et al.

(10) Patent No.: US 12,595,441 B2
(45) **Date of Patent: *Apr. 7, 2026**

(54) AUTOMATIC DISHWASHING COMPOSITION COMPRISING A PROTEASE

(71) Applicant: The Procter & Gamble Company, Cincinnati, OH (US)

(72) Inventors: Michelle Jackson, Newcastle Upon Tyne (GB); Karolina Anna Korzycka, Gateshead (GB); Carly Pickering, Tyne & Wear (GB); Philip Frank Souter, Morpeth (GB); Viktor Yuryevich Alekseyev, Palo Alto, CA (US); Lilia Maria Babe, Emerald Hills, CA (US); Lydia Dankmeyer, Rotterdam (NL); Roopa Santosh Ghirnikar, Sunnyvale, CA (US); Frits Goedegebuur, Vlaardingen (NL); Thijs Kaper, Half Moon Bay, CA (US); Harm Jan Mulder, Voorhout (NL); Nils Henning Redestig, Amsterdam (NL); Sander Van Stigt-Thans, Nieuwerkerk aan den IJ ssel (NL)

(73) Assignee: The Procter & Gamble Company, Cincinnati, OH (US)

( * ) Notice: Subject to any disclaimer, the term of this patent is extended or adjusted under 35 U.S.C. 154(b) by 531 days.

This patent is subject to a terminal disclaimer.

(21) Appl. No.: 18/065,645

(22) Filed: Dec. 14, 2022

(65) Prior Publication Data

US 2024/0166973 A1 May 23, 2024

Related U.S. Application Data

(60) Provisional application No. 63/290,125, filed on Dec. 16, 2021.

(51) Int. Cl.
*C11D 3/386* (2006.01)
*C11D 1/825* (2006.01)

(52) U.S. Cl.
CPC .......... *C11D 3/38609* (2013.01); *C11D 1/825* (2013.01); *C11D 3/38636* (2013.01)

(58) Field of Classification Search
None
See application file for complete search history.

(56) References Cited

U.S. PATENT DOCUMENTS

| | | | |
|---|---|---|---|
| 4,760,025 A | 7/1988 | Estell | |
| 5,362,414 A | 11/1994 | Outtrup et al. | |
| 5,679,630 A | 10/1997 | Baeck | |
| 6,017,871 A * | 1/2000 | Baeck | A61Q 11/02 510/393 |
| 6,165,966 A | 12/2000 | Mciver | |
| 6,312,936 B1 | 11/2001 | Poulose | |
| 9,429,449 B2 | 8/2016 | Huang | |
| 9,493,730 B2 | 11/2016 | Meek | |
| 9,670,436 B2 | 6/2017 | Jackson | |
| 10,538,721 B2 * | 1/2020 | Dirr | A47L 15/0002 |
| 10,538,722 B2 | 1/2020 | Gjermansen et al. | |
| 10,563,186 B2 | 2/2020 | Andersen et al. | |
| 10,731,111 B2 | 8/2020 | Mole et al. | |
| 11,473,075 B2 | 10/2022 | Estell et al. | |
| 2012/0149625 A1 | 6/2012 | Simonsen | |
| 2012/0156733 A1 | 6/2012 | Cuevas et al. | |
| 2014/0228274 A1 | 8/2014 | Mikkelsen | |
| 2015/0072913 A1 | 3/2015 | Aehle et al. | |
| 2015/0080283 A1 | 3/2015 | Bisgaard-frantzen et al. | |
| 2016/0251641 A1 | 9/2016 | Svendsen et al. | |
| 2017/0321159 A1 | 11/2017 | Lant et al. | |
| 2020/0291374 A1 | 9/2020 | Babe et al. | |
| 2022/0064621 A1 | 3/2022 | Degering et al. | |
| 2022/0112476 A1 | 4/2022 | Gao et al. | |
| 2022/0154110 A1 | 5/2022 | Mussmann et al. | |
| 2022/0204960 A1 | 6/2022 | Mussmann et al. | |
| 2022/0251477 A1 | 8/2022 | Weber et al. | |
| 2023/0348879 A1 | 11/2023 | Cascao-pereira et al. | |
| 2023/0365897 A1 * | 11/2023 | Jackson | C11D 3/386 |
| 2024/0401017 A1 | 12/2024 | Shaw et al. | |

FOREIGN PATENT DOCUMENTS

| | | |
|---|---|---|
| DE | 102006022216 A1 | 11/2007 |
| DE | 102006022224 A1 | 11/2007 |
| EP | 1022334 A2 | 7/2000 |
| EP | 2358857 B1 | 5/2017 |

(Continued)

OTHER PUBLICATIONS

PDF NCBI Reference Sequence ID: WP_143850013.1 first seen at NCBI on Jul. 31, 2019 (downloaded Jul. 22, 2025) (Year: 2019).*
All Office Actions; U.S. Appl. No. 18/065,644, Dec. 14, 2022.
U.S. Appl. No. 18/065,644, filed Dec. 14, 2022, Michelle Jackson et al.
PCT Search Report and Written Opinion for PCT/US2022/081484 dated May 2, 2023, 15 pages.

*Primary Examiner* — Anand U Desai
(74) *Attorney, Agent, or Firm* — Elizabeth A. Conklin; Carolyn S. Powell

(57) ABSTRACT

Fabric and home care compositions including a surfactant and a protease. The automatic dishwashing composition is in the form of a water-soluble unit-dose pouch including a compartment. The compartment includes both a powder component and a gel component. The protease is a subtilisin variant that includes: (i) a mutation at position 122; and (ii) one or more mutations at positions 126, 127, 128, 211 and 212, with reference to SEQ ID NO: 1. The variant has at least about 80% identity to the amino acid sequence of SEQ ID NO: 1.

17 Claims, No Drawings

Specification includes a Sequence Listing.

(56) References Cited

FOREIGN PATENT DOCUMENTS

| | | | |
|---|---|---|---|
| WO | 8906270 | A1 | 7/1989 |
| WO | 9217577 | A1 | 10/1992 |
| WO | 9422800 | A1 | 10/1994 |
| WO | 9623873 | A1 | 8/1996 |
| WO | 9700324 | A1 | 1/1997 |
| WO | 9813458 | A1 | 4/1998 |
| WO | 0060060 | A2 | 10/2000 |
| WO | 03054184 | A1 | 7/2003 |
| WO | 03054185 | A1 | 7/2003 |
| WO | 03055974 | A2 | 7/2003 |
| WO | 2004067737 | A2 | 8/2004 |
| WO | 2005052146 | A2 | 6/2005 |
| WO | 2005052161 | A2 | 6/2005 |
| WO | 2005056782 | A2 | 6/2005 |
| WO | 2006000060 | A1 | 1/2006 |
| WO | 2006002643 | A2 | 1/2006 |
| WO | 2007044993 | A2 | 4/2007 |
| WO | 2007106293 | A1 | 9/2007 |
| WO | 2008063400 | A1 | 5/2008 |
| WO | 2008087417 | A1 | 7/2008 |
| WO | 2008087424 | A1 | 7/2008 |
| WO | 2008106214 | A1 | 9/2008 |
| WO | 2008106215 | A1 | 9/2008 |
| WO | 2009149130 | A2 | 12/2009 |
| WO | 2009149271 | A2 | 12/2009 |
| WO | 2011036153 | A1 | 3/2011 |
| WO | 2011100410 | A2 | 8/2011 |
| WO | 2013003659 | A1 | 1/2013 |
| WO | 2014019405 | A1 | 2/2014 |
| WO | 2014099523 | A1 | 6/2014 |
| WO | 2014164777 | A1 | 10/2014 |
| WO | 2014194032 | A1 | 12/2014 |
| WO | 2014194117 | A2 | 12/2014 |
| WO | 2015024739 | A2 | 2/2015 |
| WO | 2015089441 | A1 | 6/2015 |
| WO | 2015089447 | A1 | 6/2015 |
| WO | 2015091989 | A1 | 6/2015 |
| WO | 2015091990 | A1 | 6/2015 |
| WO | 2015143360 | A2 | 9/2015 |
| WO | 2015193488 | A1 | 12/2015 |
| WO | 2016066756 | A2 | 5/2016 |
| WO | 2016066757 | A2 | 5/2016 |
| WO | 2016069557 | A1 | 5/2016 |
| WO | 2016069563 | A1 | 5/2016 |
| WO | 2016069569 | A2 | 5/2016 |
| WO | 2016075078 | A2 | 5/2016 |
| WO | 2016091688 | A1 | 6/2016 |
| WO | 2016174234 | A2 | 11/2016 |
| WO | 2016180748 | A1 | 11/2016 |
| WO | 2016183509 | A1 | 11/2016 |
| WO | 2017089093 | A1 | 6/2017 |
| WO | 2017192657 | A1 | 11/2017 |
| WO | 2017215925 | A1 | 12/2017 |
| WO | 2018118950 | A1 | 6/2018 |
| WO | 2020156419 | A1 | 8/2020 |
| WO | 2020221578 | A1 | 11/2020 |
| WO | 2020221579 | A1 | 11/2020 |
| WO | 2020221580 | A1 | 11/2020 |
| WO | 2020242858 | A1 | 12/2020 |
| WO | 2021013687 | A1 | 1/2021 |
| WO | 2021080948 | A2 | 4/2021 |
| WO | 2021081547 | A2 | 4/2021 |

* cited by examiner

AUTOMATIC DISHWASHING COMPOSITION COMPRISING A PROTEASE

TECHNICAL FIELD

The present disclosure is in the field of automatic dishwashing compositions.

BACKGROUND

A protease (also known as a proteinase) is an enzyme that has the ability to break down other proteins. A protease has the ability to conduct proteolysis, which begins protein catabolism by hydrolysis of peptide bonds that link amino acids together in a peptide or polypeptide chain forming the protein. This activity of a protease as a protein-digesting enzyme is termed a proteolytic activity. Many well-known procedures exist for measuring proteolytic activity (Kalisz, "Microbial Proteinases," In: Fiechter (ed.), *Advances in Biochemical Engineering/Biotechnology*, (1988)). For example, proteolytic activity may be ascertained by comparative assays which analyze the respective protease's ability to hydrolyze a commercial substrate. Exemplary substrates useful in the analysis of protease or proteolytic activity, include, but are not limited to, di-methyl casein (Sigma C-9801), bovine collagen (Sigma C-9879), bovine elastin (Sigma E-1625), and Keratin Azure (Sigma-Aldrich K8500). Colorimetric assays utilizing these substrates are well known in the art (see, e.g., WO 99/34011 and U.S. Pat. No. 6,376,450, both of which are incorporated herein by reference).

Serine proteases are enzymes (EC No. 3.4.21) possessing an active site serine that initiates hydrolysis of peptide bonds of proteins. Serine proteases comprise a diverse class of enzymes having a wide range of specificities and biological functions that are further divided based on their structure into chymotrypsin-like (trypsin-like) and subtilisin-like. The prototypical subtilisin (EC No. 3.4.21.62) was initially obtained from *Bacillus subtilis*. Subtilisins and their homologues are members of the S8 peptidase family of the MEROPS classification scheme (Rawlings, N. D. et al (2016) Twenty years of the MEROPS database of proteolytic enzymes, their substrates and inhibitors. Nucleic Acids Res 44, D343-D350). Members of family S8 have a catalytic triad in the order Asp, His and Ser in their amino acid sequence. Although a number of useful variant proteases have been developed for cleaning applications, there remains a need for improved protease variants.

There also remains a need for improved protease variants having improved stability in oxidative environments, including during production of the variant, during storage of a composition comprising the variant, and during use (e.g. in a wash bath), especially when the variant is used in combination with a bleach.

There also remains a need to provide an automatic dishwashing detergent composition that can provide good cleaning and have good stability.

In addition, there remains a need to provide an automatic dishwashing composition in the form of a water-soluble unit-dose pouch comprising a compartment, wherein the compartment comprises both a powder component and a gel component, and wherein the composition comprises a surfactant and a protease, and wherein the composition has good cleaning performance, good protease performance, and good stability.

SUMMARY

The present disclosure relates to an automatic dishwashing composition comprising a surfactant and a protease, wherein the automatic dishwashing composition is in the form of a water-soluble unit-dose pouch comprising a compartment, wherein the compartment comprises both a powder component and a gel component, wherein the protease is a subtilisin variant that comprises:

(i) a mutation at position 122; and (ii) one or more mutations at positions 126, 127, 128, 211 and 212, with reference to SEQ ID NO: 1.

INCORPORATION BY REFERENCE

A sequence listing compliant with new ST26 formatting that sets forth the nucleotide sequence for the present application is filed herewith as an xml text file titled "CM5384-seq". This xml file was created on Jun. 1, 2023, is approximately 5 KB in size, and is an xml conversion of the originally-filed ASCII text file. In accordance with MPEP § 605.08 and 37 CFR § 1.52(e), the subject matter in the xml file is incorporated herein by reference to the application.

DETAILED DESCRIPTION

Automatic Dishwashing Composition

The automatic dishwashing composition comprises a surfactant and a protease.

The automatic dishwashing composition is in the form of a water-soluble unit-dose pouch comprising a compartment, wherein the compartment comprises both a powder component and a gel component.

Preferably, the composition is in the form of a multi-compartment pouch that comprises two or more compartments, preferably three or more compartments. At least one of the compartments comprise both a powder component and a gel component.

The protease may be present in the gel component.

The composition may comprise a bleach, wherein the bleach is present in the powder component.

The composition is very well suited to be presented in the form of a multi-compartment pack, more in particular a multi-compartment pack comprising compartments with compositions in different physical forms, for example a compartment comprising a composition in solid form and another compartment comprising a composition in liquid form. The composition is preferably enveloped by a water-soluble film such as polyvinyl alcohol. Especially preferred are compositions in unit dose form wrapped in a polyvinyl alcohol film having a thickness of less than 100 μm, preferably from 20 to 90 μm. The detergent composition weighs from about 8 to about 25 grams, preferably from about 10 to about 20 grams. This weight range fits comfortably in a dishwasher dispenser. Even though this range amounts to a low amount of detergent, the detergent has been formulated in a way that provides all the benefits mentioned herein above.

The composition is preferably phosphate free. By "phosphate-free" is herein understood that the composition comprises less than 1%, preferably less than 0.1% by weight of the composition of phosphate.

The composition is typically a detergent composition. The term "detergent composition" or "detergent formulation" is used in reference to a composition intended for use in a wash medium for the cleaning of soiled or dirty objects. In some embodiments, the detergents of the disclosure comprise one or more subtilisin variant described herein and, in addition, one or more surfactants, transferase(s), hydrolytic enzymes, oxido reductases, builders (e.g., a builder salt), bleaching agents, bleach activators, bluing agents, fluorescent dyes, caking inhibitors, masking agents, enzyme stabilizers, calcium, enzyme activators, antioxidants, and/or solubilizers. In some instances, a builder salt is a mixture of a silicate salt and a phosphate salt, preferably with more silicate (e.g., sodium metasilicate) than phosphate (e.g., sodium tripolyphosphate). Some embodiments are directed to cleaning compositions or detergent compositions that do not contain any phosphate (e.g., phosphate salt or phosphate builder).

The term "adjunct material" refers to any liquid, solid, or gaseous material included in cleaning composition other than one or more subtilisin variant described herein, or recombinant polypeptide or active fragment thereof. In some embodiments, the cleaning compositions of the present disclosure include one or more cleaning adjunct materials. Each cleaning adjunct material is typically selected depending on the particular type and form of cleaning composition (e.g., liquid, granule, powder, bar, paste, spray, tablet, gel, foam, or other composition). Preferably, each cleaning adjunct material is compatible with the protease enzyme used in the composition.

The phrase "composition(s) substantially-free of boron" or "detergent(s) substantially-free of boron" refers to composition(s) or detergent(s), respectively, that contain trace amounts of boron, for example, less than about 1000 ppm (1 mg/kg or liter equals 1 ppm), less than about 100 ppm, less than about 50 ppm, less than about 10 ppm, or less than about 5 ppm, or less than about 1 ppm, perhaps from other compositions or detergent constituents.

The term "bleaching" refers to the treatment of a material (e.g., fabric, laundry, pulp, etc.) or surface for a sufficient length of time and/or under appropriate pH and/or temperature conditions to effect a brightening (i.e., whitening) and/or cleaning of the material. Examples of chemicals suitable for bleaching include, but are not limited to, for example, $ClO_2$, $H_2O_2$, peracids, $NO_2$, etc. Bleaching agents also include enzymatic bleaching agents such as perhydrolase and arylesterases. Another embodiment is directed to a composition comprising one or more subtilisin variant described herein, and one or more perhydrolase, such as, for example, is described in WO2005/056782, WO2007/106293, WO 2008/063400, WO2008/106214, and WO2008/106215.

The term "wash performance" of a protease (e.g., one or more subtilisin variant described herein, or recombinant polypeptide or active fragment thereof) refers to the contribution of one or more subtilisin variant described herein to washing that provides additional cleaning performance to the detergent as compared to the detergent without the addition of the one or more subtilisin variant described herein to the composition. Wash performance is compared under relevant washing conditions. In some test systems, other relevant factors, such as detergent composition, sud concentration, water hardness, washing mechanics, time, pH, and/or temperature, can be controlled in such a way that condition(s) typical for household application in a certain market segment (e.g. automatic dishwashing, dishware cleaning, tableware cleaning, etc.) are imitated.

The phrase "relevant washing conditions" is used herein to indicate the conditions, particularly washing temperature, time, washing mechanics, sud concentration, type of detergent and water hardness, actually used in households in a hand dishwashing, automatic dishwashing, or laundry detergent market segment.

The term "dish wash" refers to both household and industrial dish washing and relates to both automatic dish washing (e.g. in a dishwashing machine).

The term "disinfecting" refers to the removal of contaminants from the surfaces, as well as the inhibition or killing of microbes on the surfaces of items.

The term "compact" form of the cleaning compositions herein is best reflected by density and, in terms of composition, by the amount of inorganic filler salt. Inorganic filler salts are conventional ingredients of detergent compositions in powder form. In conventional detergent compositions, the filler salts are present in substantial amounts, typically about 17 to about 35% by weight of the total composition. In contrast, in compact compositions, the filler salt is present in amounts not exceeding about 15% of the total composition. In some embodiments, the filler salt is present in amounts that do not exceed about 10%, or more preferably, about 5%, by weight of the composition. In some embodiments, the inorganic filler salts are selected from the alkali and alkaline-earth-metal salts of sulfates and chlorides. In some embodiments, the filler salt is sodium sulfate.

Gel Component

The gel component may also be referred to herein as gel, gel-like phase or gel phase.

The gel component is preferably anhydrous. By anhydrous it is meant comprises less than 10 wt %, or less than 8 wt %, or less than 6 wt %, or less than 4 wt %, or less than 2 wt %, or less than 1 wt % water, or comprises no deliberately added water.

The gel component typically comprises enzyme, typically comprises the protease, and if present also typically comprises an amylase.

The gel component may comprise enzymes selected from proteases, amylases, lipases, hemicellulases, cellulases, perhydrolases or oxidoreductases, and combination thereof. Typically, the gel component, is to be understood as meaning a composition/phase which has an internally structuring network. This internally structuring (spatial) network is formed by the dispersion of a solid but distributed substance with long or highly branched particles and/or gelling agent in at least one liquid (the at least one liquid is liquid at 20° C.). Such gel phases behave thermoreversibly.

This gel phase can, for example, be flowable or dimensionally stable. The gel-like phase is preferably dimensionally stable at room temperature. In the preparation, the gel former, preferably Xanthan, gelatin or polyvinyl alcohol and/or derivatives thereof, is brought into contact with a solvent, preferably organic solvent, preferably one or more polyhydric alcohol(s). This gives a flowable mixture which can be brought into a desired shape. After a certain period of time, a gel phase is obtained which remains in the predetermined shape, i.e. is dimensionally stable. This time, the solidification time, is preferably 15 minutes or less, preferably 10 minutes or less, particularly preferably 5 minutes or less. At the same time, the at least one gel phase yields to pressure, but does not deform as a result, but returns to the initial state after the pressure has ceased. The at least one gel phase is preferably elastic, in particular linearly elastic.

The at least one gel phase is preferably a shaped body. A shaped body is a single body which stabilizes itself in its impressed shape. This dimensionally stable body is formed from a molding material (e.g. a composition) by bringing this molding material into a predetermined shape in a targeted manner, e.g. by pouring a liquid composition into a casting mold and subsequently curing the liquid composition, e.g. within the scope of a sol-gel process. Certain minimum requirements are imposed on formulations of the at least one gel phase. Thus, as already stated, the gel phase must solidify within as short a time as possible. Long solidification times would lead to a long production time and thus to high costs. Solidification time means the period during which the at least one gel phase changes from a free-flowing state into a dimensionally stable state which is not free-flowing at room temperature during the preparation. Below room temperature, typically a temperature of 20° C. The at least one gel phase is preferably a solid gel phase. In this case, it is cut-resistant. It can be cut, for example, with a knife after solidification, without being destroyed further, apart from the cut carried out.

In addition, the at least one gel phase is preferably translucent (translucent) or transparent, resulting in a good optical impression. The transmission of the gel phase (without dye) is preferably in a range between 100% and 20%, between 100% and 30%, in particular between 100% and 40%. To measure the light transmittance (transmission), the transmittance in % at 600 nm was determined against water as a reference at 20° C. For this purpose, the composition was poured into the 1 1 mm round cuvettes provided and, after a storage time of 12 h at room temperature, measured in a LICO 300 color measuring system according to length. The at least one gel phase is low in water. For the purposes of the present disclosure, low water content means that small amounts of water can be used to prepare the at least one gel phase. The proportion of water in the gel phase is in particular 20% by weight or less, preferably 15% by weight or less, in particular 12% by weight or less, in particular between 10 and 5% by weight. The data in % by weight are based on the total weight of the gel phase. This has the advantage that the small amounts of water in combination of PVOH can have a structure-forming or gel-forming effect.

According to a preferred embodiment, the at least one gel phase is essentially anhydrous. This means that the gel phase is preferably essentially free of water. “Substantially free” here means that small amounts of water may be present in the gel phase. This water can be introduced into the phase, for example, by means of a solvent or as water of crystallization or on account of reactions of constituents of the phase with one another. However, only small amounts, in particular no water, are preferred as solvents are used for the preparation of the gel phase. In this embodiment, the proportion of water in the gel phase is 4.9% by weight or less, 4% by weight or less, preferably 2% by weight or less, in particular 1% by weight or less, in particular 0.5% by weight or less, in particular 0.1% by weight or 0.05% by weight or less. The percentages by weight are based on the total weight of the gel phase.

The gel component typically comprises a gel former, preferably selected from gelatin, xanthan and/or polyvinyl alcohol, in particular gelatin or polyvinyl alcohol, particularly preferably polyvinyl alcohol, in an amount of from 4 to 40% by weight, in particular from 6 to 30% by weight, particularly preferably in an amount of from 7 to 24% by weight, very particularly preferably from 8 to 22% by weight, in particular, for example, from 14 to 20% by weight, in each case based on the total weight of the gel-like phase.

Preferably, the at least one gel phase particularly preferably comprises PVOH (polyvinyl alcohol) and/or derivatives thereof. Polyvinyl alcohols are thermoplastics which are usually prepared as white to yellowish powders by hydrolysis of polyvinyl acetate. polyvinyl alcohol (PVOH) is resistant to almost all anhydrous organic compounds.

Preference is given to polyvinyl alcohols having a molar mass of from 30,000 to 60,000 g/mol.

Preferred derivatives of PVOH are copolymers of polyvinyl alcohol with other monomers, in particular copolymers with anionic monomers. Suitable anionic monomers are preferably vinylacetic acid, alkyl acrylates, maleic acid and derivatives thereof, in particular monoalkyl maleates (in particular monomethyl maleate), dialkyl maleates (in particular dimethyl maleate), Maleic anhydride, fumaric acid and derivatives thereof, especially monoalkyl fumarate (especially monomethyl fumarate), dialkyl fumarate (especially dimethyl fumarate), fumaric anhydride, itaconic acid and derivatives thereof, especially dialkyl itaconate, dimethyl itaconate, itaconic anhydride, citraconic acid (methylmaleic acid) and derivatives thereof, monoalkyl citraconic acid (in particular methyl citraconate), dialkyl citraconic acid (dimethyl citraconate), citraconic anhydride, mesaconic acid, (methylfumaric acid) and derivatives thereof, monoalkylmesaconate, dialkylmesaconate, mesaconic anhydride, glutaconic acid and derivatives thereof, monoalkyl glutaconate, dialkyl glutaconate, glutaconic anhydride, vinyl sulfonic acid, alkyl sulfonic acid, ethylene sulfonic acid, 2-acrylamido-1-methylpropanesulfonic acid, 2-acrylamido-2-methylpropanesulfonic acid, 2-methylacrylamido-2-methylpropanesulfonic acid, 2-sulfoethyl acrylate, and combinations thereof, and the alkali metal salts or esters of the abovementioned monomers. Particularly preferred derivatives of PVOH are those which are selected from copolymers of polyvinyl alcohol with a monomer, in particular selected from the group of monoalkyl maleates (in particular monomethyl maleate), dialkyl maleates (in particular dimethyl maleate), maleic anhydride, and combinations thereof, and the alkali metal salts or esters of the abovementioned monomers. The values given for polyvinyl alcohols themselves apply to the suitable molecular weights. For the purposes of the present disclosure, it is preferred that the at least one gel phase comprises a polyvinyl alcohol and/or derivatives thereof, preferably by weight of polyvinyl alcohol whose degree of hydrolysis is preferably 70 to 100 mol %, in particular 80 to 90 mol %, particularly preferably 81 to 89 mol % and in particular 82 to 88 mol %.

Particular preference is given to polyvinyl alcohols which, as white-yellowish powders or granules having degrees of polymerization in the range from about 100 to 2500 (molar masses of about 4000 to 100,000 g/mol) and degrees of hydrolysis of from 80 to 99 Mol %, preferably from 85 to 90 Mol %, in particular from 87 to 89 Mol %, for example 88 Mol %, which accordingly still contain a residual content of acetyl groups.

PVOH powders having the abovementioned properties which are suitable for use in the at least one gel phase are sold, for example, under the name Mowiol® or Poval® by Kuraray. Also suitable is, for example, Exceval® AQ4104 from Kuraray. Particularly suitable are Mowiol C30, the Poval® qualities, in particular the qualities 3-83, 3-88, 6-88, 4-85, and particularly preferably 4-88, very particularly preferably Poval 4-88 S2, and Mowiol® 4-88 from Kuraray.

The water-solubility of polyvinyl alcohol can be determined by aftertreatment with aldehydes (acetalization) or ketones (ketalization). polyvinyl alcohols which are acetalized or ketalized with the aldehyde or keto groups of saccharides or polysaccharides or mixtures thereof have proven to be particularly preferred and particularly advantageous because of their extremely good solubility in cold water. The reaction products of polyvinyl alcohol and starch can be used with extreme advantage. Furthermore, the solubility in water can be changed by complexing with Ni or Cu salts or by treatment with dichromates, boric acid, Borax and thus adjusted in a targeted manner to desired values.

According to a preferred embodiment, the at least one enzyme or enzymes, preferably the protease variant of the present disclosure is/are not introduced into the gel phase, in particular into the gel phase with gel former, as a liquid enzyme preparation. It is particularly preferred that the liquid enzyme-enzyme preparations are not introduced into gel phases in which the gel former is selected from gelatin, xanthan and/or polyvinyl alcohol, in particular gelatin or polyvinyl alcohol, particularly preferably polyvinyl alcohol. The introduction of liquid enzyme preparations into gel phases still heated by the preparation, in particular in the preparation of PVOH-containing gel phases, is carried out at high temperatures which lead to a considerable reduction in the stability of the enzymes in the liquid enzyme preparation. A reduction in stability means that the activity of the enzymes is markedly reduced compared with the starting preparation. This reduction in stability can be measured, for example, by determining the residual enzyme activity or else by comparing the purification performance of the corresponding enzymes, in particular in accordance with IHF standards. The enzymes are particularly preferably incorporated into the gel phases as granules.

PVOH is particularly suitable for preparing gel phases which satisfy the requirements shown above. Particular preference is therefore given to at least one gel phase which, in addition to at least one enzyme, in particular at least one enzyme granulate, preferably selected from the group of proteases and/or amylases, PVOH and at least one polyhydric alcohol. Particularly preferably, the at least one gel phase comprises at least one amylase granulate and/or at least one protease granulate, PVOH and at least one polyhydric alcohol.

The at least one gel phase preferably comprises at least one enzyme, preferably at least one enzyme granulate, preferably at least one amylase granulate and/or at least one protease granulate, in particular at least one protease granulate, PVOH and/or derivatives thereof in a proportion of from about 4% by weight to 40% by weight, in particular from 6% by weight to 30% by weight, preferably from 7 to 24% by weight, particularly preferably between 8% by weight and 22% by weight. Significantly lower proportions of PVOH do not lead to the formation of a stable gel phase. The values are in each case based on the total weight of the gel phase.

These gel phases thus prepared have a particularly high melting point, are dimensionally stable (even at 40° C.) and do not change their shape, or change their shape only insignificantly, even during storage. In particular, they are also less reactive with regard to a direct negative interaction with constituents of the granular mixture.

In particular, PVOH can also produce gel phases with little or no water content without difficulty. When PVOH is used as the polymer for the at least one gel phase, low-viscosity melts result at 1 10-120° C., which can thereby be processed particularly easily; in particular, the gel phase can be introduced into the water-soluble coating quickly and accurately without sticking taking place or the amount being metered inaccurately. Furthermore, these gel phases adhere particularly well to the water-soluble coating, in particular if it is likewise produced from PVOH. This is also optically advantageous. As a result of the rapid solidification of the at least one gel phase with PVOH, the further processing of the gel phases can take place particularly quickly. Furthermore, the good solubility of the gel phases produced is particularly favorable for the overall solubility of the cleaning agent. In addition, gel phases with such short solidification times are advantageous, since the at least one solid phase, comprising granular mixtures, in particular powder, dosed thereon does not sink into the not yet completely solidified or too soft gel. This leads to visually unpleasant detergent portions.

In particular, in the case of the multiphase disposable portions having at least one solid phase, it is important that the at least one gel phase is dimensionally stable, so that as few interactions as possible can take place between the solid and the gel phase. If the at least one gel phase also comprises gelatin in addition to PVOH, the toughness of the gel phase in the preparation is surprisingly increased.

The present disclosure further preferably provides cleaning agents, preferably dishwashing agents, in particular automatic dishwashing agents, which, in addition to the at least one enzyme, preferably the at least one enzyme granulate, at least one organic solvent, in particular selected from 1,2-propanediol, 1,3-propanediol, glycerol, 1,1,1-trimethylolpropane, triethylene glycol, dipropylene glycol, polyethylene glycols and/or mixtures thereof.

The at least one gel phase preferably comprises at least one polyhydric alcohol. The at least one polyhydric alcohol makes it possible, in addition to the production of flowable gel phases also the preparation of a dimensionally stable, non-flowable gel phase within a short solidification time which is within 15 min or less, in particular within 10 min or less. polyhydric alcohols for the purposes of the present disclosure are hydrocarbons in which two, three or more hydrogen atoms are replaced by OH groups. The OH groups are bonded to different carbon atoms in each case. A carbon atom has no two OH groups. This differs from (simple) alcohols in which only one hydrogen atom in hydrocarbons is replaced by an OH group. polyhydric alcohols having two OH groups are referred to as alkanediols, and polyhydric alcohols having three OH groups are referred to as alkanetriols. A polyhydric alcohol thus corresponds to the general formula [KWj(OH)X, wherein KW represents a hydrocarbon which is linear or branched, saturated or unsaturated, substituted or unsubstituted. substitution can be carried out, for example, with —SH or —NH groups. Preferably, kW is a linear or branched, saturated or unsaturated, unsubstituted hydrocarbon. KW comprises at least two carbon atoms. the polyhydric alcohol comprises 2, 3 or more OH groups (x=2, 3, 4.), only one OH group being bonded to each C atom of the KW. KW particularly preferably comprises 2 to 10, i.e. 2, 3, 4, 5, 6, 7, 8, 9, or 10 carbon atoms. polyhydric alcohols with x=2, 3 or 4 (for example pentaerythritol with x=4) can be used in particular. Preferably, x=2 (alkanediol) and/or x=3 (alkanetriol).

Particularly preferably, the at least one gel phase comprises at least one alkanetriol and/or at least one alkanediol, in particular at least one C3-to C10-alkanetriol and/or at least one C3- to C10-alkanediol, preferably at least one C3- to Cs-alkanetriol and/or at least one C3- to Cs-alkanediol, particularly at least one C3- to C6-alkanetriol and/or at least one C3- to C5-alkanediol as polyhydric alcohol. It preferably comprises an alkanetriol and an alkanediol as at least one polyhydric alcohol. In a preferred embodiment, the at least one gel phase therefore comprises at least one polymer, in particular PVOH or PVOH with gelatin, and at least one alkanediol and at least one alkanetriol, in particular an alkanetriol and an alkanediol. Preference is likewise given to a gel phase which comprises at least one polymer, PVOH or PVOH with gelatin, and also a C3- to Cs-alkanediol and a C3- to Cs-alkanetriol. Preference is further given to a gel phase which comprises at least one polymer, in particular PVOH or PVOH with gelatin, and also a C3- to Cs-alkanediol and a C3- to C6-alkanetriol. The polyhydric alcohols do not comprise any derivatives, such as ethers, esters, etc. thereof.

It has been found that particularly short solidification times can be achieved when a corresponding triol (alkanetriol) is combined with a corresponding diol (alkanediol). In addition, the gel phases obtained are transparent and have a glossy surface which provides an attractive visual impression.

Preferably, the automatic dishwashing composition comprises at least one organic solvent in the gel-like phase in amounts of from 30 to 90% by weight, in particular from 40 to 85% by weight, particularly preferably from 50 to 80% by weight, based on the total weight of the gel-like phase.

The amount of polyhydric alcohol or polyhydric alcohols used in gel phases is preferably at least 45% by weight, in particular 55% by weight or more. Preferred ranges of amounts here are from 45% by weight to 85% by weight, in particular from 50% by weight to 80% by weight, based on the total weight of the gel phase.

Preference is given to C3-C6-alkanetriol glycerol and/or 2-ethyl-2-(hydroxymethyl)-1,3-propanediol (also called 1,1,1-trimethylolpropane) and/or 2-amino-2-(hydroxymethyl)-1,3-propanediol (TRIS, trishydroxymethylaminoethane) and/or 1,3, 5-pentanetriol. Particular preference is given to C.sub.3-C.sub.6-alkanetriol glycerol and/or 2-ethyl-2-(hydroxymethyl)-1,3-propanediol (also called 1,1-trimethylolpropane). The C.sub.3-C.sub.5-alkanediol is, for example, 1,5-pentanediol,3-methyl-1,5-pentanediol,1,4-butanediol,1,3-propanediol and/or 1,2-propanediol, preferably 1,3-propanediol and/or 1,2-propanediol. Surprisingly, it has been found that the chain length of the diol and, in particular, the position of the OH groups have an influence on the transparency of the gel phase. The OH groups of the diol are therefore preferably not arranged on directly adjacent carbon atoms. In particular, there are three or four carbon atoms, particularly preferably 3, between the two OH groups of the diol.

The diol 1,3-propanediol is particularly preferred. Surprisingly, it has been found that particularly good results are achieved with mixtures comprising glycerol and 1,3-propanediol and/or 1,2-propanediol, in particular glycerol and 1,3-propanediol.

Polyethylene glycol(s) having an average molar mass of from 200 to 600 g/mol are preferably additionally used in the at least one gel phase or the gel phases. polyethylene glycols having an average molar mass of between about 200 and about 600 g/mol, preferably between 300 and 500 g/mol, particularly preferably between 350 and 450 g/mol, for example around 400 g/mol INCI: PEG400) are used in combination with polyvinyl alcohol.

Suitable polyethylene glycol(s) have an average molar mass of from 300 to 500 g/mol, in particular from 350 to 450 g/mol.

Furthermore, the at least one gel phase preferably comprises a further anionic polymer, in particular polycarboxylates. These may be used either as builders and/or as a thickening polymer. The at least one gel phase may further comprise anionic polymers or copolymers having builder properties. This is preferably a polycarboxylate. The polycarboxylate used is preferably a copolymeric polyacrylate, preferably a sulphopolymer, preferably a copolymeric polysulphonate, preferably a hydrophobically modified copolymeric polysulphonate. The copolymers may have two, three, four or more different monomer units. Preferred copolymeric polysulfonates contain, in addition to monomer(s) containing sulfonic acid groups, at least one monomer from the group of unsaturated carboxylic acids.

Protease

In one embodiment, the present disclosure provides one or more subtilisin variant comprising one or more amino acid substitutions as described in more detail below. In some embodiments, the variants provided herein demonstrate one or more improved properties, such as an improved cleaning performance, or improved stability, or both an improved cleaning performance and an improved stability when compared to a subtilisin having the amino acid sequence of SEQ ID NO: 1 or 2. The subtilisin variants provided herein find use in the preparation of cleaning compositions (e.g. automatic dishwashing compositions). In addition, the subtilisin variants provided herein also find use in methods of cleaning (e.g. dish washing methods) using such variants or compositions comprising such subtilisin variants.

Unless otherwise indicated herein, one or more subtilisin variant described herein can be made and used by a variety of techniques used in molecular biology, microbiology, protein purification, protein engineering, protein and DNA sequencing, recombinant DNA fields, and industrial enzyme use and development. Terms and abbreviations not defined should be accorded their ordinary meaning as used in the art. Unless defined otherwise herein, all technical and scientific terms used herein have the same meaning as commonly understood by one of ordinary skill in the art. Any definitions provided herein are to be interpreted in the context of the specification as a whole. As used herein, the singular "a," "an" and "the" includes the plural unless the context clearly indicates otherwise. Unless otherwise indicated, nucleic acid sequences are written left to right in 5' to 3' orientation; and amino acid sequences are written left to right in amino to carboxy orientation. Each numerical range used herein includes every narrower numerical range that falls within such broader numerical range, as if such narrower numerical ranges were all expressly written herein.

As used herein in connection with a numerical value, the term "about" refers to a range of +/−0.5 of the numerical value, unless the term is otherwise specifically defined in context. For instance, the phrase a "pH value of about 6" refers to pH values of from 5.5 to 6.5, unless the pH value is specifically defined otherwise.

The nomenclature of the amino acid substitutions of the one or more subtilisin variants described herein uses one or more of the following: position; position:amino acid substitution(s); or starting amino acid(s):position:amino acid substitution(s). Reference to a "position" (e.g. 5, 8, 17, 22, etc) encompasses any starting amino acid that may be present at such position, and any substitution that may be present at such position. Reference to a "position: amino acid substitution(s)" (e.g. 1S/T/G, 3G, 17T, etc) encompasses any starting amino acid that may be present at such position and the one or more amino acid(s) with which such starting amino acid may be substituted. Reference to a position can be recited in several forms, for example, position 003 can also be referred to as position 03 or 3. Reference to a starting or substituted amino acid may be further expressed as several starting, or substituted amino acids separated by a foreslash ("/"). For example, D275S/K indicates position 275 is substituted with serine (S) or lysine (K) and P/S197K indicates that starting amino acid proline (P) or serine (S) at position 197 is substituted with lysine (K). Reference to an X as the amino acid in a position, refers to any amino acid at the recited position.

The position of an amino acid residue in a given amino acid sequence is numbered by correspondence with the amino acid sequence of SEQ ID NO:1. That is, the amino acid sequence of SEQ ID NO:1 serves as a reference sequence for numbering of positions of an amino acid residue. For example, the amino acid sequence of one or more subtilisin variant described herein is aligned with the amino acid sequence of SEQ ID NO:1 using an alignment algorithm as described herein, and each amino acid residue in the given amino acid sequence that aligns (preferably optimally aligns) with an amino acid residue in SEQ ID NO:1 is conveniently numbered by reference to the numerical position of that corresponding amino acid residue. Sequence alignment algorithms, such as, for example, described herein will identify the location or locations where insertions or deletions occur in a subject sequence when compared to a query sequence (also sometimes referred to as a "reference sequence"). Sequence alignment with other subtilisin amino acid sequences can be determined using an amino acid alignment, for example, as provided in FIG. 1 of PCT Application No. PCT/US2018/062768, filed Nov. 28, 2018, claiming priority to U.S. Provisional Application No. 62/591,976, filed Nov. 29, 2017, entitled "Highly Stable Subtilisin Enzymes".

The terms "protease" and "proteinase" refer to an enzyme that has the ability to break down proteins and peptides. A protease has the ability to conduct "proteolysis," by hydrolysis of peptide bonds that link amino acids together in a peptide or polypeptide chain forming the protein. This activity of a protease as a protein-digesting enzyme is referred to as "proteolytic activity." Many well-known procedures exist for measuring proteolytic activity. For example, proteolytic activity may be ascertained by comparative assays that analyze the respective protease's ability to hydrolyze a suitable substrate. Exemplary substrates useful in the analysis of protease or proteolytic activity, include, but are not limited to, di-methyl casein (Sigma C-9801), bovine collagen (Sigma C-9879), bovine elastin (Sigma E-1625), and Keratin Azure (Sigma-Aldrich K8500). Colorimetric assays utilizing these substrates are well known in the art (See e.g., WO99/34011 and U.S. Pat. No. 6,376,450). The pNA peptidyl assay (See e.g., Del Mar et al., Anal Biochem, 99:316-320, 1979) also finds use in determining the active enzyme concentration. This assay measures the rate at which p-nitroaniline is released as the enzyme hydrolyzes a soluble synthetic substrate, such as succinyl-alanine-alanine-proline-phenylalanine-p-nitroanilide (suc-AAPF-pNA). The rate of production of yellow color from the hydrolysis reaction is measured at 405 or 410 nm on a spectrophotometer and is proportional to the active enzyme concentration. In addition, absorbance measurements at 280 nanometers (nm) can be used to determine the total protein concentration in a sample of purified protein. The activity on substrate divided by protein concentration gives the enzyme specific activity.

As used herein, "the genus *Bacillus*" includes all species within the genus "*Bacillus*," as known to those of skill in the art, including but not limited to *B. subtilis, B. licheniformis, B. lentus, B. brevis, B. stearothermophilus, B. alkalophilus, B. amyloliquefaciens, B. clausii, B. halodurans, B. megaterium, B. coagulans, B. circulans, B. gibsonii*, and *B. thuringiensis*. It is recognized that the genus *Bacillus* continues to undergo taxonomical reorganization. Thus, it is intended that the genus include species that have been reclassified, including but not limited to such organisms as *B. stearothermophilus*, which is now named "*Geobacillus stearothermophilus*", or *B. polymyxa*, which is now "*Paenibacillus polymyxa*". The production of resistant endospores under stressful environmental conditions is considered the defining feature of the genus *Bacillus*, although this characteristic also applies to the recently named *Alicyclobacillus, Amphibacillus, Aneurinibacillus, Anoxybacillus, Brevibacillus, Filobacillus, Gracilibacillus, Halobacillus, Paenibacillus, Salibacillus, Thermobacillus, Ureibacillus*, and *Virgibacillus*.

A "*B. gibsonii* subtilisin" includes any subtilisin obtained from, or derived from, a *B. gibsonii* source. In one embodiment, a subtilisin variant provided herein can be derived from a *B. gibsonii*-clade subtilisin such as those described in WO 2015/089447, as well as those described in WO2016/205755. Other *B. gibsonii* subtilisins include those described in U.S. Patent Application Publication No. 20090275493 and variants thereof, in International Patent Application Publication No. WO2016/087403 and variants thereof, and in U.S. Pat. No. 7,449,187 and variants thereof. In other embodiments, the *B. gibsonii* subtilisins include those polypeptides having an amino acid sequence having at least 80% sequence identity to SEQ ID NO: 1 or 2.

The term "vector" refers to a nucleic acid construct used to introduce or transfer nucleic acid(s) into a target cell or tissue. A vector is typically used to introduce foreign DNA into a cell or tissue. Vectors include plasmids, cloning vectors, bacteriophages, viruses (e.g., viral vector), cosmids, expression vectors, shuttle vectors, and the like. A vector typically includes an origin of replication, a multicloning site, and a selectable marker. The process of inserting a vector into a target cell is typically referred to as transformation. The present disclosure includes, in some embodiments, a vector that comprises a DNA sequence encoding a serine protease polypeptide (e.g., precursor or mature serine protease polypeptide) that is operably linked to a suitable prosequence (e.g., secretory, signal peptide sequence, etc.) capable of effecting the expression of the DNA sequence in a suitable host, and the folding and translocation of the recombinant polypeptide chain.

As used herein in the context of introducing a nucleic acid sequence into a cell, the term "introduced" refers to any method suitable for transferring the nucleic acid sequence into the cell. Such methods for introduction include but are not limited to protoplast fusion, transfection, transformation, electroporation, conjugation, and transduction. Transformation refers to the genetic alteration of a cell which results from the uptake, optional genomic incorporation, and expression of genetic material (e.g., DNA).

The term "expression" refers to the transcription and stable accumulation of sense (mRNA) or anti-sense RNA, derived from a nucleic acid molecule of the disclosure. Expression may also refer to translation of mRNA into a polypeptide. Thus, the term "expression" includes any step involved in the "production of the polypeptide" including, but not limited to, transcription, post-transcriptional modifications, translation, post-translational modifications, secretion and the like.

The phrases "expression cassette" or "expression vector" refers to a nucleic acid construct or vector generated recombinantly or synthetically for the expression of a nucleic acid of interest (e.g., a foreign nucleic acid or transgene) in a target cell. The nucleic acid of interest typically expresses a protein of interest. An expression vector or expression cassette typically comprises a promoter nucleotide sequence that drives or promotes expression of the foreign nucleic acid. The expression vector or cassette also typically includes other specified nucleic acid elements that permit transcription of a particular nucleic acid in a target cell. A recombinant expression cassette can be incorporated into a plasmid, chromosome, mitochondrial DNA, plastid DNA, virus, or nucleic acid fragment. Some expression vectors have the ability to incorporate and express heterologous DNA fragments in a host cell or genome of the host cell. Many prokaryotic and eukaryotic expression vectors are commercially available. Selection of appropriate expression vectors for expression of a protein from a nucleic acid sequence incorporated into the expression vector is within the knowledge of those of skill in the art.

As used herein, a nucleic acid is "operably linked" with another nucleic acid sequence when it is placed into a functional relationship with another nucleic acid sequence. For example, a promoter or enhancer is operably linked to a nucleotide coding sequence if the promoter affects the transcription of the coding sequence. A ribosome binding site may be operably linked to a coding sequence if it is positioned so as to facilitate translation of the coding sequence. Typically, "operably linked" DNA sequences are contiguous. However, enhancers do not have to be contiguous. Linking is accomplished by ligation at convenient restriction sites. If such sites do not exist, synthetic oligonucleotide adaptors or linkers may be used in accordance with conventional practice.

The term "gene" refers to a polynucleotide (e.g., a DNA segment), that encodes a polypeptide and includes regions preceding and following the coding regions. In some instances, a gene includes intervening sequences (introns) between individual coding segments (exons).

The term "recombinant", when used with reference to a cell typically indicates that the cell has been modified by the introduction of a foreign nucleic acid sequence or that the cell is derived from a cell so modified. For example, a recombinant cell may comprise a gene not found in identical form within the native (non-recombinant) form of the cell, or a recombinant cell may comprise a native gene (found in the native form of the cell) that has been modified and re-introduced into the cell. A recombinant cell may comprise a nucleic acid endogenous to the cell that has been modified without removing the nucleic acid from the cell; such modifications include those obtained by gene replacement, site-specific mutation, and related techniques known to those of ordinary skill in the art. Recombinant DNA technology includes techniques for the production of recombinant DNA in vitro and transfer of the recombinant DNA into cells where it may be expressed or propagated, thereby producing a recombinant polypeptide. "Recombination" and "recombining" of polynucleotides or nucleic acids refer generally to the assembly or combining of two or more nucleic acid or polynucleotide strands or fragments to generate a new polynucleotide or nucleic acid.

A nucleic acid or polynucleotide is said to "encode" a polypeptide if, in its native state or when manipulated by methods known to those of skill in the art, it can be transcribed and/or translated to produce the polypeptide or a fragment thereof. The anti-sense strand of such a nucleic acid is also said to encode the sequence.

The terms "host strain" and "host cell" refer to a suitable host for an expression vector comprising a DNA sequence of interest.

A "protein" or "polypeptide" comprises a polymeric sequence of amino acid residues. The terms "protein" and "polypeptide" are used interchangeably herein. The single and 3-letter code for amino acids as defined in conformity with the IUPAC-IUB Joint Commission on Biochemical Nomenclature (JCBN) is used throughout this disclosure. The single letter X refers to any of the twenty amino acids. It is also understood that a polypeptide may be coded for by more than one nucleotide sequence due to the degeneracy of the genetic code.

The terms "prosequence" or "propeptide sequence" refer to an amino acid sequence between the signal peptide sequence and mature protease sequence that is necessary for the proper folding and secretion of the protease; they are sometimes referred to as intramolecular chaperones. Cleavage of the prosequence or propeptide sequence results in a mature active protease. Bacterial serine proteases are often expressed as pro-enzymes. Examples of modified propeptides are provided, for example, in WO 2016/205710.

The terms "signal sequence" and "signal peptide" refer to a sequence of amino acid residues that may participate in the secretion or direct transport of the mature or precursor form of a protein. The signal sequence is typically located N-terminal to the precursor or mature protein sequence. The signal sequence may be endogenous or exogenous. A signal sequence is normally absent from the mature protein. A signal sequence is typically cleaved from the protein by a signal peptidase after the protein is transported.

The term "mature" form of a protein, polypeptide, or peptide refers to the functional form of the protein, polypeptide, or peptide without the signal peptide sequence and propeptide sequence.

The term "precursor" form of a protein or peptide refers to a mature form of the protein having a prosequence operably linked to the amino or carbonyl terminus of the protein. The precursor may also have a "signal" sequence operably linked to the amino terminus of the prosequence. The precursor may also have additional polypeptides that are involved in post-translational activity (e.g., polypeptides cleaved therefrom to leave the mature form of a protein or peptide).

The term "wildtype", with respect to a polypeptide, refers to a naturally-occurring polypeptide that does not include a man-made substitution, insertion, or deletion at one or more amino acid positions. Similarly, the term "wildtype", with respect to a polynucleotide, refers to a naturally-occurring polynucleotide that does not include a man-made substitution, insertion, or deletion at one or more nucleotides. A polynucleotide encoding a wildtype polypeptide is, however, not limited to a naturally-occurring polynucleotide, and encompasses any polynucleotide encoding the wildtype or parental polypeptide.

The term "parent", with respect to a polypeptide, includes reference to a naturally-occurring, or wildtype, polypeptide or to a naturally-occurring polypeptide in which a man-made substitution, insertion, or deletion at one or more amino acid positions has been made. The term "parent" with respect to a polypeptide also includes any polypeptide that has protease activity that serves as the starting polypeptide for alteration, such as substitutions, additions, and/or deletions, to result in a variant having one or more alterations in comparison to the starting polypeptide. That is, a parental, or reference polypeptide is not limited to a naturally-occurring wildtype polypeptide, and encompasses any wildtype, parental, or reference polypeptide. Similarly, the term "parent," with respect to a polynucleotide, can refer to a naturally-occurring polynucleotide or to a polynucleotide that does include a man-made substitution, insertion, or deletion at one or more nucleotides. The term "parent" with respect to a polynucleotide also includes any polynucleotide that encodes a polypeptide having protease activity that serves as the starting polynucleotide for alteration to result in a variant protease having a modification, such as substitutions, additions, and/or deletions, in comparison to the starting polynucleotide. That is, a polynucleotide encoding a wildtype, parental, or reference polypeptide is not limited to a naturally-occurring polynucleotide, and encompasses any polynucleotide encoding the wildtype, parental, or reference polypeptide. In some embodiments, the parent polypeptide comprises a *B. gibsonii* subtilisin. In some embodiments, the parent polypeptide herein, comprises a polypeptide having the amino acid sequence set forth in SEQ ID NO:1.

The term "naturally-occurring" refers to, for example, a sequence and residues contained therein (e.g., polypeptide sequence and amino acids contained therein or nucleotide sequence and nucleotides contained therein) that are found in nature. Conversely, the term "non-naturally occurring" refers to, for example, a sequence and residues contained therein (e.g., polypeptide sequences and amino acids contained therein or nucleotide sequence and nucleic acids contained therein) that are not found in nature.

As used herein with regard to amino acid residue positions, "corresponding to" or "corresponds to" or "corresponds" refers to an amino acid residue at the enumerated position in a protein or peptide, or an amino acid residue that is analogous, homologous, or equivalent to an enumerated residue in a protein or peptide. As used herein, "corresponding region" generally refers to an analogous position in a related protein or a reference protein.

The terms "derived from" and "obtained from" refer to not only a protein produced or producible by a strain of the organism in question, but also a protein encoded by a DNA sequence isolated from such strain and produced in a host organism containing such DNA sequence. Additionally, the term refers to a protein which is encoded by a DNA sequence of synthetic and/or cDNA origin and which has the identifying characteristics of the protein in question. To exemplify, "proteases derived from *Bacillus*" refers to those enzymes having proteolytic activity that are naturally produced by *Bacillus*, as well as to serine proteases like those produced by *Bacillus* sources but which through the use of genetic engineering techniques are produced by other host cells transformed with a nucleic acid encoding the serine proteases.

The term "identical" in the context of two polynucleotide or polypeptide sequences refers to the nucleotides or amino acids in the two sequences that are the same when aligned for maximum correspondence, as measured using sequence comparison or analysis algorithms described below and known in the art.

The phrases "% identity" or "percent identity" or "PID" refers to protein sequence identity. Percent identity may be determined using standard techniques known in the art. The percent amino acid identity shared by sequences of interest can be determined by aligning the sequences to directly compare the sequence information, e.g., by using a program such as BLAST, MUSCLE, or CLUSTAL. The BLAST algorithm is described, for example, in Altschul et al., J Mol Biol, 215:403-410 (1990) and Karlin et al., Proc Natl Acad Sci USA, 90:5873-5787 (1993). A percent (%) amino acid sequence identity value is determined by the number of matching identical residues divided by the total number of residues of the "reference" sequence including any gaps created by the program for optimal/maximum alignment. BLAST algorithms refer to the "reference" sequence as the "query" sequence.

As used herein, "homologous proteins" or "homologous proteases" refers to proteins that have distinct similarity in primary, secondary, and/or tertiary structure. Protein homology can refer to the similarity in linear amino acid sequence when proteins are aligned. Homology can be determined by amino acid sequence alignment, e.g., using a program such as BLAST, MUSCLE, or CLUSTAL. Homologous search of protein sequences can be done using BLASTP and PSI-BLAST from NCBI BLAST with threshold (E-value cut-off) at 0.001. (Altschul et al., "Gapped BLAST and PSI BLAST a new generation of protein database search programs", Nucleic Acids Res, Set 1; 25(17):3389-402(1997)). The BLAST program uses several search parameters, most of which are set to the default values. The NCBI BLAST algorithm finds the most relevant sequences in terms of biological similarity but is not recommended for query sequences of less than 20 residues (Altschul et al., Nucleic Acids Res, 25:3389-3402, 1997 and Schaffer et al., Nucleic Acids Res, 29:2994-3005, 2001). Exemplary default BLAST parameters for a nucleic acid sequence searches include: Neighboring words threshold=1; E-value cutoff=10; Scoring Matrix=NUC.3.1 (match=1, mismatch=−3); Gap Opening=5; and Gap Extension=2. Exemplary default BLAST parameters for amino acid sequence searches include: Word size=3; E-value cutoff=10; Scoring Matrix=BLOSUM62; Gap Opening=11; and Gap extension=1. Using this information, protein sequences can be grouped and/or a phylogenetic tree built therefrom. Amino acid sequences can be entered in a program such as the Vector NTI Advance suite and a Guide Tree can be created using the Neighbor Joining (NJ) method (Saitou and Nei, Mol Biol Evol, 4:406-425, 1987). The tree construction can be calculated using Kimura's correction for sequence distance and ignoring positions with gaps. A program such as AlignX can display the calculated distance values in parenthesis following the molecule name displayed on the phylogenetic tree.

Understanding the homology between molecules can reveal the evolutionary history of the molecules as well as information about their function; if a newly sequenced protein is homologous to an already characterized protein, there is a strong indication of the new protein's biochemical function. Two molecules are said to be homologous if they have been derived from a common ancestor. Homologous molecules, or homologs, can be divided into two classes, paralogs and orthologs. Paralogs are homologs that are present within one species. Paralogs often differ in their detailed biochemical functions. Orthologs are homologs that are present within different species and have very similar or identical functions. A protein superfamily is the largest grouping (clade) of proteins for which common ancestry can be inferred. Usually this common ancestry is based on sequence alignment and mechanistic similarity. Superfamilies typically contain several protein families which show sequence similarity within the family. The term "protein clan" is commonly used for protease superfamilies based on the MEROPS protease classification system. As used herein, the term "subtilisin" includes any member of the S8 serine protease family as described in MEROPS—The Peptidase Data base (Rawlings, N. D., et al (2016) Twenty years of the MEROPS database of proteolytic enzymes, their substrates and inhibitors. Nucleic Acids Res 44, D343-D350).

The CLUSTAL W algorithm is another example of a sequence alignment algorithm (See, Thompson et al., Nucleic Acids Res, 22:4673-4680, 1994). Default parameters for the CLUSTAL W algorithm include: Gap opening penalty=10.0; Gap extension penalty=0.05; Protein weight matrix=BLOSUM series; DNA weight matrix=IUB; Delay divergent sequences %=40; Gap separation distance=8; DNA transitions weight=0.50; List hydrophilic residues=GPSNDQEKR; Use negative matrix=OFF; Toggle Residue specific penalties=ON; Toggle hydrophilic penalties=ON; and Toggle end gap separation penalty=OFF. In CLUSTAL algorithms, deletions occurring at either terminus are included. For example, a variant with a five amino acid deletion at either terminus (or within the polypeptide) of a polypeptide of 500 amino acids would have a percent sequence identity of 99% (495/500 identical residues×100) relative to the "reference" polypeptide. Such a variant would be encompassed by a variant having "at least 99% sequence identity" to the polypeptide.

A nucleic acid or polynucleotide is "isolated" when it is at least partially or completely separated from other components, including but not limited to, for example, other proteins, nucleic acids, cells, etc. Similarly, a polypeptide, protein or peptide is "isolated" when it is at least partially or completely separated from other components, including but not limited to, for example, other proteins, nucleic acids, cells, etc. On a molar basis, an isolated species is more abundant than are other species in a composition. For example, an isolated species may comprise at least about 60%, about 65%, about 70%, about 75%, about 80%, about 85%, about 90%, about 91%, about 92%, about 93%, about 94%, about 95%, about 96%, about 97%, about 98%, about 99%, or about 100% (on a molar basis) of all macromolecular species present. Preferably, the species of interest is purified to essential homogeneity (i.e., contaminant species cannot be detected in the composition by conventional detection methods). Purity and homogeneity can be determined using a number of techniques well known in the art, such as agarose or polyacrylamide gel electrophoresis of a nucleic acid or a protein sample, respectively, followed by visualization upon staining. If desired, a high-resolution technique, such as high performance liquid chromatography (HPLC) or a similar means can be utilized for purification of the material.

The term "purified" as applied to nucleic acids or polypeptides generally denotes a nucleic acid or polypeptide that is essentially free from other components as determined by analytical techniques well known in the art (e.g., a purified polypeptide or polynucleotide forms a discrete band in an electrophoretic gel, chromatographic eluate, and/or a media subjected to density gradient centrifugation). For example, a nucleic acid or polypeptide that gives rise to essentially one band in an electrophoretic gel is "purified." A purified nucleic acid or polypeptide is at least about 50% pure, usually at least about 60%, about 65%, about 70%, about 75%, about 80%, about 85%, about 90%, about 91%, about 92%, about 93%, about 94%, about 95%, about 96%, about 97%, about 98%, about 99%, about 99.5%, about 99.6%, about 99.7%, about 99.8% or more pure (e.g., percent by weight on a molar basis). In a related sense, a composition is enriched for a molecule when there is a substantial increase in the concentration of the molecule after application of a purification or enrichment technique. The term "enriched" refers to a compound, polypeptide, cell, nucleic acid, amino acid, or other specified material or component that is present in a composition at a relative or absolute concentration that is higher than in a starting composition.

The term "cleaning activity" refers to a cleaning performance achieved by a serine protease polypeptide, variant, or reference subtilisin under conditions prevailing during the proteolytic, hydrolyzing, cleaning, or other process of the disclosure. In some embodiments, cleaning performance of a serine protease or reference subtilisin may be determined by using various assays for cleaning one or more enzyme sensitive stain on an item or surface (e.g., a stain resulting from food, grass, blood, ink, milk, oil, and/or egg protein). Cleaning performance of one or more subtilisin variant described herein or reference subtilisin can be determined by subjecting the stain on the item or surface to standard wash condition(s) and assessing the degree to which the stain is removed by using various chromatographic, spectrophotometric, or other quantitative methodologies. Exemplary cleaning assays and methods are known in the art and include, but are not limited to those described in WO99/34011 and U.S. Pat. No. 6,605,458, as well as those cleaning assays and methods included in the Examples provided below.

The term "effective amount" of one or more subtilisin variant described herein or reference subtilisin refers to the amount of protease that achieves a desired level of enzymatic activity in a specific cleaning composition. Such effective amounts are readily ascertained by one of ordinary skill in the art and are based on many factors, such as the particular protease used, the cleaning application, the specific composition of the cleaning composition, and whether a liquid or dry (e.g., granular, tablet, bar) composition is required, etc.

Disclosed herein is one or more subtilisin variant useful for cleaning applications and in methods of cleaning, as well as in a variety of industrial applications. Also disclosed herein is one or more isolated, recombinant, substantially pure, or non-naturally occurring subtilisin variant. In some embodiments, one or more subtilisin variant described herein is useful in cleaning applications and can be incorporated into cleaning compositions that are useful in methods of cleaning an item or a surface in need thereof.

The protease is a subtilisin variant that comprises:

(i) a mutation at position 122; and (ii) one or more mutations at positions 126, 127, 128, 211 and 212, with reference to SEQ ID NO: 1, and wherein the variant has at least 80% identity to the amino acid sequence of SEQ ID NO: 1.

Preferably, the variant comprises:

(i) the mutation at position M122L; and (ii) one or more mutations at positions 126, 127, 128, 211 and 212, Preferably, the variant comprises two or more mutations at positions 126, 127, 128, 211 and 212, preferably three or more mutations at positions 126, 127, 128, 211 and 212, preferably four or more mutations at positions 126, 127, 128, 211 and 212, preferably five mutations at positions 126, 127, 128, 211 and 212.

Preferably, the variant comprises one or more mutations selected from X126A, X127E, X128G, X211Q and X212Q, preferably two or more mutations selected from X126A, X127E, X128G, X211Q and X212Q, preferably three or more mutations selected from X126A, X127E, X128G, X211Q and X212Q, preferably four or more mutations selected from X126A, X127E, X128G, X211Q and X212Q, preferably five mutations selected from X126A, X127E, X128G, X211Q and X212Q.

Preferably, the variant comprises the mutations X122L, X126A, X127E, X128G, X211Q and X212Q.

Preferably, the variant comprises one or more mutations selected from S126A, D127E, F128G, M211Q and N212Q, preferably two or more mutations selected from S126A, D127E, F128G, M211Q and N212Q, preferably three or more mutations selected from S126A, D127E, F128G, M211Q and N212Q, preferably four or more mutations selected from S126A, D127E, F128G, M211Q and N212Q, preferably five mutations selected from S126A, D127E, F128G, M211Q and N212Q.

Preferably, the variant comprises the mutations M122L, S126A, D127E, F128G, M211Q and N212Q.

In another embodiment, subtilisin variants are provided, where the variant comprises substitutions i) at least one, two, three, four, or five substitution selected from the group consisting of S039E, S099R, S126A, D127E, and F128G, and ii) one or more additional substitutions selected from the group consisting of N74D, T114L, M122L, M122I, N198A, M211Q, N212Q, and N242D, where the amino acid positions are numbered by correspondence with the amino acid sequence of SEQ ID NO: 1 and where the variant has at least 80% sequence identity to the amino acid sequence of SEQ ID NO: 1.

In another embodiment, subtilisin variants are provided, where the variant comprises the amino acid substitutions X039E-X099R-X126A-X127E-X128G and further comprises one or more additional substitutions at one, two, three, or more positions selected from the group consisting of 74, 114, 122, 198, 211, 212, and 242, where the amino acid positions are numbered by correspondence with the amino acid sequence of SEQ ID NO: 1. In some embodiments herein, reference to the substitutions X039E, X099R, X126A, X127E, and X128G, includes S039E, S099R, S126A, D127E, and F128G In another embodiment, subtilisin variants are provided, where the variant comprises the amino acid substitutions selected from one or more substitutions selected from X039E, X099R, X126A, X127E, and X128G and further comprises one or more additional substitutions selected from the group consisting of X74D, X114L, X122L, X122I, X198A, X211Q, X212Q, and X242D, where the amino acid positions are numbered by correspondence with the amino acid sequence of SEQ ID NO: 1.

In another embodiment, subtilisin variants are provided, where the variant comprises the amino acid substitutions selected from one or more substitutions selected from S039E, S099R, S126A, D127E, and F128G and further comprises one or more additional substitutions selected from the group consisting of N74D, T114L, M122L, M122I, N198A, M211Q, N212Q, and N242D, where the amino acid positions are numbered by correspondence with the amino acid sequence of SEQ ID NO: 1.

In another embodiment, subtilisin variants are provided, where the variant comprises i) two, or more amino acid substitutions selected from the group consisting of S039E, N74D, S099R, N242D and, ii) one or more additional substitutions selected from the group consisting of T114L, M122L, M122I, S126A, F128G, N198A, M211Q, N212Q, where the amino acid positions are numbered by correspondence with the amino acid sequence of SEQ ID NO: 1.

In another embodiment, subtilisin variants are provided, where the variants comprise a set of substitutions selected from the group consisting of S039E-S099R-S126A-D127E-F128G-M211Q-N242D, S039E-N074D-S099R-M122L-S126A-D127E-F128G-N198A-M211Q-N212Q, S039E-N074D-S099R-M122L-S126A-D127E-F128G-N198A-M211Q-N212Q-N242D, S039E-N074D-S099R-S126A-D127E-F128G-M211Q-N212Q-N242D, S039E-N074D-S099R-S126A-D127E-F128G-N198A-M211Q-N212Q-N242D, S039E-N074D-S099R-S126A-D127E-F128G-N198G, S039E-N074D-S099R-T114L-S126A-D127E-F128G, S039E-N074D-S099R-T114L-M122L-S126A-D127E-F128G-N198A-M211Q-N212Q, S039E-N074D-S099R-T114L-M122L-S126A-D127E-F128G-N198A-M211Q-N212Q-N242D, S039E-N074D-S099R-T114L-S126A-D127E-F128G-M211E, S039E-N074D-S099R-T114L-S126A-D127E-F128G-M211E-N242D, S039E-N074D-S099R-T114L-S126A-D127E-F128G, M211Q, S039E-N074D-S099R-T114L-S126A-D127E-F128G-M211Q-N212Q-N242D, S039E-N074D-S099R-T114L-S126A-D127E-F128G-N198A-M211Q-N212Q, S039E-N074D-S099R-T114L-S126A-D127E-F128G-N198A-M211Q-N212Q-N242D, 5039E-S099R-S126A-D127E-F128G-N198G-M211Q-N212Q, 5039E-S099R-T114L-S126A-D127E-F128G-M211E, 5039E-S099R-T114L-S126A-D127E-F128G-M211E-N212Q, 5039E-S099R-T114L-S126A-D127E-F128G-M211E-N242D, 5039E-S099R-Ti14L-S126A-D127E-F128G-M211Q, 5039E-S099R-T114L-S126A-D127E-F128G-M211Q-N212Q-N242D, 5039E-S099R-T114L-S126A-D127E-F128G-M211Q-N242D, and 5039E-S099R-T114L-S126A-D127E-F128G-N242D, where the amino acid positions are numbered by correspondence with the amino acid sequence of SEQ ID NO: 1.

Another embodiment is directed to one or more subtilisin variant described herein with the proviso that one or more substitutions is non-naturally occurring. Yet an even still further embodiment is directed to one or more subtilisin variant described herein wherein said variant (i) is a *B. gibsonii* BG46 subtilisin; (ii) is isolated; (iii) has proteolytic activity; or (iv) comprises a combination of (i) to (iii). Still yet another embodiment is directed to one or more subtilisin variant described herein, wherein said variant is derived from a parent or reference polypeptide with (i) 70%, 75%, 80%, 85%, 86%, 87%, 88%, 89%, 90%, 91%, 92%, 93%, 94%, 95%, 96%, 97%, 98%, 99%, or 100% amino acid sequence identity to the amino acid sequence of SEQ ID NO:1 or 2; or (ii) 100% amino acid sequence identity to the amino acid sequence of SEQ ID NO:1 or 2. In still another embodiment the parent comprises the amino acid sequence of SEQ ID NO: 1 or 2. An even further embodiment is directed to one or more subtilisin variant described herein, wherein said variant comprises an amino acid sequence with (i) 60%, 65%. 70%, 75%, 80%, 85%, 86%, 87%, 88%, 89%, 90%, 91%, 92%, 93%, 94%, 95%, 96%, 97%, 98%, 99% or less than 100% amino acid sequence identity to the amino acid sequence of SEQ ID NO:1 or 2; (ii) 80%, 85%, 86%, 87%, 88%, 89%, 90%, 91%, 92%, 93%, 94%, 95%, 96%, 97%, 98%, 99% or less than 100% amino acid sequence identity to the amino acid sequence of SEQ ID NO:1; (iii) 96%, 97%, 98%, 99%, or less than 100% amino acid sequence identity to the amino acid sequence of SEQ ID NO:1 or 2.

In some embodiments, the subtilisin parent or variant molecule provided herein also comprise at least one, two, three, or more additional substitutions selected from X012E/L/V, X021V, X025R, X037E, X039T, X041F, X043V, X044P, X060D, X078D, X079L, X084A, X087E, X097D, X099E, X101G, X012L, X107E, X115D, X1171, X118N, X122L, X127P, X142G, X145S, X149S, X154D, X156A, X160S, X167D, X174A, X175N, X176E, X177E/I/V, X185E, X188A, X200E, X205D, X208N, X209N, X211L/N/S, X212D/H/N, X222S, X228I, X230E/H, X236D, X247N, X250D, and X253D/P. Examples of combinations of such one, two, three, or more substitutions that may be combined with the variants provided herein, include, but are not limited to X253D-X256E, X025R-X117I-X118N, X044P-X175N-X208N-X230H, X041F-X078D-X084A, X101G-X174A, X021V-X177I, X021V-X142G-X188A, X021V-X122L-X222S, X012L-X021V-X122L-X222S, X021V-X122L-X253D, X021V-X177V-X228I, X021V-X039T-X122L-X177E, X021V-X079L-X087E-X209N-X222S, X021V-X122L-X222S-X247N, X021V-X122L, X039E-X074D-X087E, X039E-X074D-X087E-X253D, X021V-X039E-X074D-X087E-X253D, X039E-X074D-X087E-X122L-X253D, X021V-X039E-X074D-X087E-X122L-X253D, X097D-X099E, X122L-X145S-X156A, X211N-X212D, X211L-X212D, X127P-X211L-X212D, and X012L-X122L-X222S.

The disclosure includes subtilisin variants of having one or more modifications at a surface exposed amino acid. Surface modifications in the enzyme variants can be useful in a detergent composition by having a minimum performing index for wash performance, stability of the enzyme in detergent compositions and thermostability of the enzyme, while having at least one of these characteristics improved from a parent subtilisin enzyme. In some embodiments, the surface modification changes the hydrophobicity and/or charge of the amino acid at that position. Hydrophobicity can be determined using techniques known in the art, such as those described in White and Wimley (White, S. H. and Wimley, W. C., (1999) Annu. Rev. Biophys. Biomol. Struct. 28:319-65. As used herein, “surface property” can be used in reference to electrostatic charge, as well as properties such as the hydrophobicity and hydrophilicity exhibited by the surface of a protein.

In an even still further embodiment, one or more subtilisin variant described herein has one or more improved property when compared to a reference or parent subtilisin; wherein the improved property is selected from improved cleaning performance in detergents, improved stability; and combinations thereof.

The term “enhanced stability” or “improved stability” in the context of an oxidation, chelator, denaturant, surfactant, thermal and/or pH stable protease refers to a higher retained proteolytic activity over time as compared to a reference protease, for example, a wild-type protease or parent protease. Autolysis has been identified as one mode of subtilisin activity loss in liquid detergents. (Stoner et al., 2004 Protease autolysis in heavy-duty liquid detergent formulations: effects of thermodynamic stabilizers and protease inhibitors, Enzyme and Microbial Technology 34:114-125.).

The terms “thermally stable” and “thermostable” and “thermostability” with regard to a protease variant refer to a protease that retains a greater amount of residual activity when compared to the parent or reference protease after exposure to altered temperatures over a given period of time under conditions (or “stress conditions”) prevailing during proteolytic, hydrolysing, cleaning or other process. Residual activity is the amount of activity remaining after the test compared to the initial activity of the sample and can be reported as a percentage e.g. % remaining activity. “Altered temperatures” encompass increased or decreased temperatures. In some embodiments, the variant proteases provided herein retain at least about 5%, about 10%, about 20%, about 30%, about 40%, about 50%, about 60%, about 70%, about 80%, about 85%, about 90%, about 92%, about 95%, about 96%, about 97%, about 98%, or about 99% proteolytic activity after exposure to temperatures of 40° C. to 80° C., over a given time period, for example, at least about 5 minutes, at least about 20 minutes, at least about 60 minutes, about 90 minutes, about 120 minutes, about 180 minutes, about 240 minutes, about 300 minutes, about 360 minutes, about 420 minutes, about 480 minutes, about 540 minutes, about 600 minutes, about 660 minutes, about 720 minutes, about 780 minutes, about 840 minutes, about 900 minutes, about 960 minutes, about 1020 minutes, about 1080 minutes, about 1140 minutes, or about 1200 minutes.

The subtilisin variants provided herein may be used in the production of various compositions, such as enzyme compositions and cleaning or detergent compositions. An enzyme composition comprises a subtilisin variant as provided herein. The enzyme composition can be in any form, such as granule, liquid formulations, or enzyme slurries.

Enzyme granules may be made by, e.g., rotary atomization, wet granulation, dry granulation, spray drying, disc granulation, extrusion, pan coating, spheronization, drum granulation, fluid-bed agglomeration, high-shear granulation, fluid-bed spray coating, crystallization, precipitation, emulsion gelation, spinning disc atomization and other casting approaches, and prilling processes. The core of the granule may be the granule itself or the inner nucleus of a layered granule.

The core may comprise one or more water soluble or dispersible agent(s), including but not limited to, sodium sulfate, sodium chloride, magnesium sulfate, zinc sulfate, and ammonium sulfate), citric acid, sugars (e.g., sucrose, lactose, glucose, granulated sucrose, maltodextrin and fructose), plasticizers (e.g., polyols, urea, dibutyl phthalate, and dimethyl phthalate), fibrous material (e.g., cellulose and cellulose derivatives such as hydroxyl-propyl-methyl cellulose, carboxy-methyl cellulose, and hydroxyl-ethyl cellulose), phosphate, calcium, a protease inhibitor and combinations thereof. Suitable dispersible agents include, but are not limited to, clays, nonpareils (combinations of sugar and starch; e.g., starch-sucrose non-pareils—ASNP), talc, silicates, carboxymethyl cellulose, starch, and combinations thereof.

In some embodiments, the core comprises mainly sodium sulfate. In some embodiments, the core consists essentially of sodium sulfate. In a particular embodiment, the core consists of only sodium sulfate.

In some embodiments, the core comprises a subtilisin variant as provided herein. In other embodiments, the core comprises one or more enzymes in addition to protease. In other embodiments, the core is inert and does not comprise enzymes.

In some embodiments, the core is an enzyme powder, including UFC containing an enzyme. The enzyme powder may be spray dried and may optionally be admixed with any of the water soluble or dispersible agents listed, herein. The enzyme may be, or may include, the protease to be stabilized, in which case the enzyme power should further include a stabilizer.

In some embodiments, the core is coated with at least one coating layer. In a particular embodiment, the core is coated with at least two coating layers. In another particular embodiment the core is coated with at least three coating layers. The materials used in the coating layer(s) can be suitable for use in cleaning and/or detergent compositions (see, e.g., US20100124586, WO9932595 and U.S. Pat. No. 5,324,649.

In some embodiments, a coating layer comprises one of more of the following materials: an inorganic salt (e.g., sodium sulfate, sodium chloride, magnesium sulfate, zinc sulfate, and ammonium sulfate), citric acid, a sugar (e.g., sucrose, lactose, glucose, and fructose), a plasticizer (e.g., polyols, urea, dibutyl phthalate, and dimethyl phthalate), fibrous material (e.g., cellulose and cellulose derivatives such as hydroxyl-propyl-methyl cellulose, carboxy-methyl cellulose, and hydroxyl-ethyl cellulose), clay, nonpareil (a combination of sugar and starch), silicate, carboxymethyl cellulose, phosphate, starch (e.g., corn starch), fats, oils (e.g., rapeseed oil, and paraffin oil), lipids, vinyl polymers, vinyl copolymers, polyvinyl alcohol (PVA), plasticizers (e.g., polyols, urea, dibutyl phthalate, dimethyl phthalate, and water), anti-agglomeration agents (e.g., talc, clays, amorphous silica, and titanium dioxide), anti-foam agents (such as FOAMBLAST 882® and EROL 6000K®), and talc. US20100124586, WO9932595, and U.S. Pat. No. 5,324,649 detail suitable components for the coating layers.

In some embodiments, the coating layer comprises sugars (e.g., sucrose, lactose, glucose, granulated sucrose, maltodextrin and fructose). In some embodiments, the coating layer comprises a polymer such as polyvinyl alcohol (PVA). Suitable PVA for incorporation in the coating layer(s) of the multi-layered granule include partially hydrolyzed, fully hydrolyzed and intermediately hydrolyzed having low to high degrees of viscosity. In some embodiments, the coating layer comprises an inorganic salt, such as sodium sulfate.

In some embodiments, at least one coating layer is an enzyme coating layer. In some embodiments, the core is coated with at least two enzyme layers. In another embodiment, the core is coated with at least three or more enzyme layers.

In some embodiments, the enzymes are subtilisin variants as provided herein in combination with one or more additional enzymes selected from the group consisting of acyl transferases, amylases, alpha-amylases, beta-amylases, alpha-galactosidases, arabinases, arabinosidases, aryl esterases, beta-galactosidases, beta-glucanases, carrageenases, catalases, cellulases, chondroitinases, cutinases, dispersins, endo-glucanases, endo-beta-mannanases, exo-beta-mannanases, esterases, exo-mannanases, galactanases, glucoamylases, hemicellulases, hexosaminidase, hyaluronidases, keratinases, laccases, lactases, ligninases, lipases, lipolytic enzymes, lipoxygenases, lysozyme, mannanases, metalloproteases, nucleases, oxidases, oxidoreductases, pectate lyases, pectin acetyl esterases, pectinases, pentosanases, perhydrolases, peroxidases, PETases, phenoloxidases, phosphatases, phospholipases, phytases, polyesterases, polygalacturonases, additional proteases, pullulanases, reductases, rhamnogalacturonases, tannases, transglutaminases, xylan acetyl-esterases, xylanases, and xylosidases; and combinations thereof or mixture thereof. Generally, at least one enzyme coating layer comprises at least one protease.

The above enzyme lists are examples only and are not meant to be exclusive. Any enzyme can be used in the granules described herein, including wild type, recombinant and variant enzymes of bacterial, fungal, yeast sources, and acid, neutral or alkaline enzymes.

Another embodiment is directed to a method of cleaning a surface, where the method comprises contacting a surface or an item in need of cleaning with an effective amount of one or more subtilisin variants as provided herein, or composition containing one or more subtilisin variants, as provided herein. In some embodiments, the surface or item in need of cleaning comprises a proteinaceous stain on the surface. In some embodiments, the surface or item in need of cleaning comprises a proteinaceous or crème brûlée, or BMI or egg or baked cheese stain. The term "stain" comprises any type of soil on the surface of an item, such as a hard-surface item (e.g. a dish) or textile. In some embodiments, the stain is a proteinaceous stain. As used herein, a "proteinaceous stain" is a stain or soil that contains protein.

A further embodiment is directed to a method of cleaning a proteinaceous stain comprising contacting a surface or an item in need of cleaning with an effective amount of one or more subtilisin variants as provided herein or composition containing one or more subtilisin variants as provided herein.

Another embodiment is directed to a method of cleaning a crème brûlée stain comprising contacting a surface or an item in need of cleaning with an effective amount of one or more subtilisin variants as provided herein or composition containing one or more subtilisin variants as provided herein.

Another embodiment is directed to a method of cleaning an egg or egg yolk stain comprising contacting a surface or an item in need of cleaning with an effective amount of one or more subtilisin variants as provided herein or composition containing one or more such subtilisin variants.

Another embodiment is directed to a method of cleaning a baked cheese stain comprising contacting a surface or an item in need of cleaning with an effective amount of one or more subtilisin variants as provided herein or composition containing one or more such subtilisin variants.

Another embodiment is directed to a method of cleaning BMI stain comprising contacting a surface or an item in need of cleaning with an effective amount of one or more subtilisin variants as provided herein or composition containing one or more such subtilisin variants.

In an even further embodiment, the one or more subtilisin variant used in the methods described herein comprises an amino acid sequence with 60%, 65%, 70%, 75%, 80%, 85%, 86%, 87%, 88%, 89%, 90%, 91%, 92%, 93%, 94%, 95%, 96%, 97%, 98%, 99% or less than 100% amino acid sequence identity to the amino acid sequence of SEQ ID NO:1 or 2. In yet another embodiment, the one or more subtilisin variant used in the method of cleaning a crème brûlée stain described herein has a crème brûlée stain cleaning PI≥1.1 when compared to SEQ ID NO:1 or 2. In still yet another embodiment, the one or more subtilisin variant used in the method of cleaning a crème brûlée stain described herein has a crème brûlée stain cleaning PI≥1.1 when compared to SEQ ID NO: 1 or 2, wherein the crème brûlée stain cleaning performance of said variant is measured in accordance with the crème brûlée assay described in Example 2. Still yet another embodiment is directed to the method of cleaning a crème brûlée stain described herein, with the proviso that the one or more subtilisin used in said method comprises one or more non-naturally occurring substitutions. In yet another embodiment, the one or more subtilisin variant used in the method of cleaning a baked cheese stain described herein has a baked cheese stain cleaning PI≥1.1 when compared to SEQ ID NO:1 or 2. In still yet another embodiment, the one or more subtilisin variant used in the method of cleaning a baked cheese stain described herein has a baked cheese stain cleaning PI≥1.1 when compared to SEQ ID NO: 1 or 2, where the a baked cheese stain cleaning performance of the variant is measured in accordance with the a baked cheese assay described in Example 2. Still yet another embodiment is directed to the method of cleaning a baked cheese stain described herein, with the proviso that the one or more subtilisin used in said method comprises one or more non-naturally occurring substitutions. In yet another embodiment, the one or more subtilisin variant used in the method of cleaning an egg yolk stain described herein has an egg yolk stain cleaning PI≥1.1 when compared to SEQ ID NO: 1 or 2. In still yet another embodiment, the one or more subtilisin variant used in the method of cleaning an egg yolk stain described herein has an egg yolk stain cleaning PI≥1.1 when compared to SEQ ID NO: 1 or 2, where the egg yolk stain cleaning performance of the variant is measured in accordance with the egg yolk assay described in Example 2. Still yet another embodiment is directed to the method of cleaning an egg yolk stain described herein, with the proviso that the one or more subtilisin used in said method comprises one or more non-naturally occurring substitutions. In yet another embodiment, the one or more subtilisin variant used in the method of cleaning a BMI stain described herein has a BMI stain cleaning PI≥1.1 when compared to SEQ ID NO:1 or 2. In still yet another embodiment, the one or more subtilisin variant used in the method of cleaning a BMI stain described herein has a BMI stain cleaning PI≥1.1 when compared to SEQ ID NO: 1 or 2, where the a BMI stain cleaning performance of the variant is measured in accordance with the a BMI assay described in Example 2. Still yet another embodiment is directed to the method of cleaning a BMI stain described herein, with the proviso that the one or more subtilisin used in said method comprises one or more non-naturally occurring substitutions. In a further embodiment, the one or more subtilisin variant used in the methods described herein (i) is isolated; (ii) has proteolytic activity; or (iii) comprises a combination of (i) and (ii).

In another embodiment, variants provided herein comprise one or more variants having amino acids substitutions selected from the group consisting of those listed in Tables 5 having a PI≥1.1 in one or more of the cleaning assays, including laundry and dish assays such as, BMI, egg, crème brûlée, and/or baked cheese assays compared to a parent subtilisin having the amino acid sequence of SEQ ID NO: 1 or 2, or a residual activity greater than that of the parent or reference subtilisin in EDTA stability assay.

One or more subtilisin variant described herein can be subject to various changes, such as one or more amino acid insertion, deletion, and/or substitution, either conservative or non-conservative, including where such changes do not substantially alter the enzymatic activity of the variant. Similarly, a nucleic acid of the present disclosure can also be subject to various changes, such as one or more substitution of one or more nucleotide in one or more codon such that a particular codon encodes the same or a different amino acid, resulting in either a silent variation (e.g., when the encoded amino acid is not altered by the nucleotide mutation) or non-silent variation; one or more deletion of one or more nucleotides (or codon) in the sequence; one or more addition or insertion of one or more nucleotides (or codon) in the sequence; and/or cleavage of, or one or more truncation, of one or more nucleotides (or codon) in the sequence. Many such changes in the nucleic acid sequence may not substantially alter the enzymatic activity of the resulting encoded polypeptide enzyme compared to the polypeptide enzyme encoded by the original nucleic acid sequence. A nucleic acid sequence described herein can also be modified to include one or more codon that provides for optimum expression in an expression system (e.g., bacterial expression system), while, if desired, said one or more codon still encodes the same amino acid(s).

Described herein is one or more isolated, non-naturally occurring, or recombinant polynucleotide comprising a nucleic acid sequence that encodes one or more subtilisin variant described herein, or recombinant polypeptide or active fragment thereof. One or more nucleic acid sequence described herein is useful in recombinant production (e.g., expression) of one or more subtilisin variant described herein, typically through expression of a plasmid expression vector comprising a sequence encoding the one or more subtilisin variant described herein or fragment thereof. One embodiment provides nucleic acids encoding one or more subtilisin variant described herein, wherein the variant is a mature form having proteolytic activity. In some embodiments, one or more subtilisin variant described herein is expressed recombinantly with a homologous pro-peptide sequence. In other embodiments, one or more subtilisin variant described herein is expressed recombinantly with a heterologous pro-peptide sequence (e.g., pro-peptide sequence from *B. lentus* (SEQ ID NO:5)).

One or more nucleic acid sequence described herein can be generated by using any suitable synthesis, manipulation, and/or isolation techniques, or combinations thereof. For example, one or more polynucleotide described herein may be produced using standard nucleic acid synthesis techniques, such as solid-phase synthesis techniques that are well-known to those skilled in the art. In such techniques, fragments of up to 50 or more nucleotide bases are typically synthesized, then joined (e.g., by enzymatic or chemical ligation methods) to form essentially any desired continuous nucleic acid sequence. The synthesis of the one or more polynucleotide described herein can be also facilitated by any suitable method known in the art, including but not limited to chemical synthesis using the classical phosphoramidite method (See e.g., Beaucage et al. Tetrahedron Letters 22:1859-69 (1981)), or the method described in Matthes et al., EMBO J. 3:801-805 (1984) as is typically practiced in automated synthetic methods. One or more polynucleotide described herein can also be produced by using an automatic DNA synthesizer. Customized nucleic acids can be ordered from a variety of commercial sources (e.g., ATUM (DNA 2.0), Newark, CA, USA; Life Tech (GeneArt), Carlsbad, CA, USA; GenScript, Ontario, Canada; Base Clear B. V., Leiden, Netherlands; Integrated DNA Technologies, Skokie, IL, USA; Ginkgo Bioworks (Gen9), Boston, MA, USA; and Twist Bioscience, San Francisco, CA, USA). Other techniques for synthesizing nucleic acids and related principles are described by, for example, Itakura et al., Ann. Rev. Biochem. 53:323 (1984) and Itakura et al., Science 198: 1056 (1984).

Recombinant DNA techniques useful in modification of nucleic acids are well known in the art, such as, for example, restriction endonuclease digestion, ligation, reverse transcription and cDNA production, and polymerase chain reaction (e.g., PCR). One or more polynucleotide described herein may also be obtained by screening cDNA libraries using one or more oligonucleotide probes that can hybridize to or PCR-amplify polynucleotides which encode one or more subtilisin variant described herein, or recombinant polypeptide or active fragment thereof. Procedures for screening and isolating cDNA clones and PCR amplification procedures are well known to those of skill in the art and described in standard references known to those skilled in the art. One or more polynucleotide described herein can be obtained by altering a naturally occurring polynucleotide backbone (e.g., that encodes one or more subtilisin variant described herein or reference subtilisin) by, for example, a known mutagenesis procedure (e.g., site-directed mutagenesis, site saturation mutagenesis, and in vitro recombination). A variety of methods are known in the art that are suitable for generating modified polynucleotides described herein that encode one or more subtilisin variant described herein, including, but not limited to, for example, site-saturation mutagenesis, scanning mutagenesis, insertional mutagenesis, deletion mutagenesis, random mutagenesis, site-directed mutagenesis, and directed-evolution, as well as various other recombinatorial approaches.

A further embodiment is directed to one or more vector comprising one or more subtilisin variant described herein (e.g., a polynucleotide encoding one or more subtilisin variant described herein); expression vectors or expression cassettes comprising one or more nucleic acid or polynucleotide sequence described herein; isolated, substantially pure, or recombinant DNA constructs comprising one or more nucleic acid or polynucleotide sequence described herein;

isolated or recombinant cells comprising one or more polynucleotide sequence described herein; and compositions comprising one or more such vector, nucleic acid, expression vector, expression cassette, DNA construct, cell, cell culture, or any combination or mixtures thereof.

Some embodiments are directed to one or more recombinant cell comprising one or more vector (e.g., expression vector or DNA construct) described herein which comprises one or more nucleic acid or polynucleotide sequence described herein. Some such recombinant cells are transformed or transfected with such at least one vector, although other methods are available and known in the art. Such cells are typically referred to as host cells. Some such cells comprise bacterial cells, including, but not limited to *Bacillus* sp. cells, such as *B. subtilis* cells. Other embodiments are directed to recombinant cells (e.g., recombinant host cells) comprising one or more subtilisin described herein.

In some embodiments, one or more vector described herein is an expression vector or expression cassette comprising one or more polynucleotide sequence described herein operably linked to one or more additional nucleic acid segments required for efficient gene expression (e.g., a promoter operably linked to one or more polynucleotide sequence described herein). A vector may include a transcription terminator and/or a selection gene (e.g., an antibiotic resistant gene) that enables continuous cultural maintenance of plasmid-infected host cells by growth in antimicrobial-containing media.

An expression vector may be derived from plasmid or viral DNA, or in alternative embodiments, contains elements of both. Exemplary vectors include, but are not limited to pC194, pJH101, pE194, pHP13 (See, Harwood and Cutting [eds.], Chapter 3, Molecular Biological Methods for *Bacillus*, John Wiley & Sons (1990); suitable replicating plasmids for *B. subtilis* include those listed on p. 92). (See also, Perego, "Integrational Vectors for Genetic Manipulations in *Bacillus subtilis*"; Sonenshein et al., [eds.]; "*Bacillus subtilis* and Other Gram-Positive Bacteria: Biochemistry, Physiology and Molecular Genetics", American Society for Microbiology, Washington, D.C. (1993), pp. 615-624); and p2JM103BBI).

For expression and production of a protein of interest (e.g., one or more subtilisin variant described herein) in a cell, one or more expression vector comprising one or more copy of a polynucleotide encoding one or more subtilisin variant described herein, and in some instances comprising multiple copies, is transformed into the cell under conditions suitable for expression of the variant. In some embodiments, a polynucleotide sequence encoding one or more subtilisin variant described herein (as well as other sequences included in the vector) is integrated into the genome of the host cell, while in other embodiments, a plasmid vector comprising a polynucleotide sequence encoding one or more subtilisin variant described herein remains as autonomous extra-chromosomal element within the cell. Some embodiments provide both extrachromosomal nucleic acid elements as well as incoming nucleotide sequences that are integrated into the host cell genome. The vectors described herein are useful for production of the one or more subtilisin variant described herein. In some embodiments, a polynucleotide construct encoding one or more subtilisin variant described herein is present on an integrating vector that enables the integration and optionally the amplification of the polynucleotide encoding the variant into the host chromosome. Examples of sites for integration are well known to those skilled in the art. In some embodiments, transcription of a polynucleotide encoding one or more subtilisin variant described herein is effectuated by a promoter that is the wild-type promoter for the parent subtilisin. In some other embodiments, the promoter is heterologous to the one or more subtilisin variant described herein, but is functional in the host cell. Exemplary promoters for use in bacterial host cells include, but are not limited to the amyE, amyQ, amyL, pstS, sacB, pSPAC, pAprE, pVeg, pHpaII promoters; the promoter of the *B. stearothermophilus* maltogenic amylase gene; the *B. amyloliquefaciens* (BAN) amylase gene; the *B. subtilis* alkaline protease gene; the *B. clausii* alkaline protease gene; the *B. pumilus* xylosidase gene; the *B. thuringiensis* cryIIIA; and the *B. licheniformis* alpha-amylase gene. Additional promoters include, but are not limited to the A4 promoter, as well as phage Lambda PR or PL promoters and the *E. coli* lac, trp or tac promoters.

One or more subtilisin variant described herein can be produced in host cells of any suitable microorganism, including bacteria and fungi. In some embodiments, one or more subtilisin variant described herein can be produced in Gram-positive bacteria. In some embodiments, the host cells are *Bacillus* spp., *Streptomyces* spp., *Escherichia* spp., *Aspergillus* spp., *Trichoderma* spp., *Pseudomonas* spp., *Corynebacterium* spp., *Saccharomyces* spp., or *Pichia* spp. In some embodiments, one or more subtilisin variant described herein is produced by *Bacillus* sp. host cells. Examples of *Bacillus* sp. host cells that find use in the production of the one or more subtilisin variant described herein include, but are not limited to *B. licheniformis, B. gibsonii, B. lentus, B. subtilis, B. amyloliquefaciens, B. brevis, B. stearothermophilus, B. alkalophilus, B. coagulans, B. circulans, B. pumilis, B. thuringiensis, B. clausii*, and *B. megaterium*, as well as other organisms within the genus *Bacillus*. In some embodiments, *B. subtilis* host cells are used to produce the variants described herein. USPNs 5,264,366 and 4,760,025 (RE 34,606) describe various *Bacillus* host strains that can be used to produce one or more subtilisin variant described herein, although other suitable strains can be used.

Several bacterial strains that can be used to produce one or more subtilisin variant described herein include non-recombinant (i.e., wild-type) *Bacillus* sp. strains, as well as variants of naturally-occurring strains and/or recombinant strains. In some embodiments, the host strain is a recombinant strain, wherein a polynucleotide encoding one or more subtilisin variant described herein has been introduced into the host. In some embodiments, the host strain is a *B. subtilis* host strain and particularly a recombinant *B. subtilis* host strain. Numerous *B. subtilis* strains are known, including, but not limited to for example, 1A6 (ATCC 39085), 168 (1A01), SB19, W23, Ts85, B637, PB1753 through PB1758, PB3360, JH642, 1A243 (ATCC 39,087), ATCC 21332, ATCC 6051, M1113, DE100 (ATCC 39,094), GX4931, PBT 110, and PEP 211 strain (See e.g., Hoch et al., Genetics 73:215-228 (1973); See also, U.S. Pat. Nos. 4,450,235; 4,302,544; and EP 0134048). The use of *B. subtilis* as an expression host cell is well known in the art (See e.g., Palva et al., Gene 19:81-87 (1982); Fahnestock and Fischer, J. Bacteriol., 165:796-804 (1986); and Wang et al., Gene 69:39-47 (1988)).

In some embodiments, the *Bacillus* host cell is a *Bacillus* sp. that includes a mutation or deletion in at least one of the following genes: degU, degS, degR and degQ. In some embodiments, the mutation is in a degU gene, and in some embodiments the mutation is degU(Hy)32 (See e.g., Msadek et al., J. Bacteriol. 172:824-834 (1990); and Olmos et al., Mol. Gen. Genet. 253:562-567 (1997)). In some embodiments, the *Bacillus* host comprises a mutation or deletion in scoC4 (See e.g., Caldwell et al., J. Bacteriol. 183:7329-7340 (2001)); spollE (See e.g., Arigoni et al., Mol. Microbiol. 31:1407-1415 (1999)); and/or oppA or other genes of the opp operon (See e.g., Perego et al., Mol. Microbiol. 5:173-185 (1991)). Indeed, it is contemplated that any mutation in the opp operon that causes the same phenotype as a mutation in the oppA gene will find use in some embodiments of the altered *Bacillus* strain described herein. In some embodiments, these mutations occur alone, while in other embodiments, combinations of mutations are present. In some embodiments, an altered *Bacillus* host cell strain that can be used to produce one or more subtilisin variant described herein is a *Bacillus* host strain that already includes a mutation in one or more of the above-mentioned genes. In addition, *Bacillus* sp. host cells that comprise mutation(s) and/or deletion(s) of endogenous protease genes find use. In some embodiments, the *Bacillus* host cell comprises a deletion of the aprE and the nprE genes. In other embodiments, the *Bacillus* sp. host cell comprises a deletion of 5 protease genes, while in other embodiments the *Bacillus* sp. host cell comprises a deletion of 9 protease genes (See e.g., US 2005/0202535).

Host cells are transformed with one or more nucleic acid sequence encoding one or more subtilisin variant described herein using any suitable method known in the art. Methods for introducing a nucleic acid (e.g., DNA) into *Bacillus* cells or *E. coli* cells utilizing plasmid DNA constructs or vectors and transforming such plasmid DNA constructs or vectors into such cells are well known. In some embodiments, the plasmids are subsequently isolated from *E. coli* cells and transformed into *Bacillus* cells. However, it is not essential to use intervening microorganisms such as *E. coli*, and in some embodiments, a DNA construct or vector is directly introduced into a *Bacillus* host.

Exemplary methods for introducing one or more nucleic acid sequence described herein into *Bacillus* cells are described in, for example, Ferrari et al., "Genetics," in Harwood et al. [eds.], *Bacillus*, Plenum Publishing Corp. (1989), pp. 57-72; Saunders et al., J. Bacteriol. 157:718-726 (1984); Hoch et al., J. Bacteriol. 93:1925-1937 (1967); Mann et al., Current Microbiol. 13:131-135 (1986); Holubova, Folia Microbiol. 30:97 (1985); Chang et al., Mol. Gen. Genet. 168:11-115 (1979); Vorobjeva et al., FEMS Microbiol. Lett. 7:261-263 (1980); Smith et al., Appl. Env. Microbiol. 51:634 (1986); Fisher et al., Arch. Microbiol. 139:213-217 (1981); and McDonald, J. Gen. Microbiol. 130:203 (1984)). Indeed, such methods as transformation, including protoplast transformation and transfection, transduction, and protoplast fusion are well known and suited for use herein. Methods known in the art to transform *Bacillus* cells include such methods as plasmid marker rescue transformation, which involves the uptake of a donor plasmid by competent cells carrying a partially homologous resident plasmid (See, Contente et al., Plasmid 2:555-571 (1979); Haima et al., Mol. Gen. Genet. 223:185-191 (1990); Weinrauch et al., J. Bacteriol. 154:1077-1087 (1983); and Weinrauch et al., J. Bacteriol. 169:1205-1211 (1987)). In this method, the incoming donor plasmid recombines with the homologous region of the resident "helper" plasmid in a process that mimics chromosomal transformation.

In addition to commonly used methods, in some embodiments, host cells are directly transformed with a DNA construct or vector comprising a nucleic acid encoding one or more subtilisin variant described herein (i.e., an intermediate cell is not used to amplify, or otherwise process, the DNA construct or vector prior to introduction into the host cell). Introduction of a DNA construct or vector described herein into the host cell includes those physical and chemical methods known in the art to introduce a nucleic acid sequence (e.g., DNA sequence) into a host cell without insertion into the host genome. Such methods include, but are not limited to calcium chloride precipitation, electroporation, naked DNA, and liposomes. In additional embodiments, DNA constructs or vector are co-transformed with a plasmid, without being inserted into the plasmid. In further embodiments, a selective marker is deleted from the altered *Bacillus* strain by methods known in the art (See, Stahl et al., J. Bacteriol. 158:411-418 (1984); and Palmeros et al., Gene 247:255-264 (2000)).

In some embodiments, the transformed cells are cultured in conventional nutrient media. The suitable specific culture conditions, such as temperature, pH and the like are known to those skilled in the art and are well described in the scientific literature. Some embodiments provide a culture (e.g., cell culture) comprising one or more subtilisin variant or nucleic acid sequence described herein.

In some embodiments, host cells transformed with one or more polynucleotide sequence encoding one or more subtilisin variant described herein are cultured in a suitable nutrient medium under conditions permitting the expression of the variant, after which the resulting variant is recovered from the culture. In some embodiments, the variant produced by the cells is recovered from the culture medium by conventional procedures, including, but not limited to, for example, separating the host cells from the medium by centrifugation or filtration, precipitating the proteinaceous components of the supernatant or filtrate by means of a salt (e.g., ammonium sulfate), and chromatographic purification (e.g., ion exchange, gel filtration, affinity, etc.).

In some embodiments, one or more subtilisin variant produced by a recombinant host cell is secreted into the culture medium. A nucleic acid sequence that encodes a purification facilitating domain may be used to facilitate purification of the variant. A vector or DNA construct comprising a polynucleotide sequence encoding one or more subtilisin variant described herein may further comprise a nucleic acid sequence encoding a purification facilitating domain to facilitate purification of the variant (See e.g., Kroll et al., DNA Cell Biol. 12:441-53 (1993)). Such purification facilitating domains include, but are not limited to, for example, metal chelating peptides such as histidine-tryptophan modules that allow purification on immobilized metals (See, Porath, Protein Expr. Purif. 3:263-281 [1992]), protein A domains that allow purification on immobilized immunoglobulin, and the domain utilized in the FLAGS extension/affinity purification system. The inclusion of a cleavable linker sequence such as Factor XA or enterokinase (e.g., sequences available from Invitrogen, San Diego, CA) between the purification domain and the heterologous protein also find use to facilitate purification.

A variety of methods can be used to determine the level of production of one or more mature subtilisin variant described herein in a host cell. Such methods include, but are not limited to, for example, methods that utilize either polyclonal or monoclonal antibodies specific for the protease. Exemplary methods include, but are not limited to enzyme-linked immunosorbent assays (ELISA), radioimmunoassays (RIA), fluorescent immunoassays (FIA), and fluorescent activated cell sorting (FACS). These and other assays are well known in the art (See e.g., Maddox et al., J. Exp. Med. 158:1211 (1983)).

Some other embodiments provide methods for making or producing one or more mature subtilisin variant described herein. A mature subtilisin variant does not include a signal peptide or a propeptide sequence. Some methods comprise making or producing one or more subtilisin variant described herein in a recombinant bacterial host cell, such as for example, a *Bacillus* sp. cell (e.g., a *B. subtilis* cell). Other embodiments provide a method of producing one or more subtilisin variant described herein, wherein the method comprises cultivating a recombinant host cell comprising a recombinant expression vector comprising a nucleic acid sequence encoding one or more subtilisin variant described herein under conditions conducive to the production of the variant. Some such methods further comprise recovering the variant from the culture.

Further embodiments provide methods of producing one or more subtilisin variant described herein, wherein the methods comprise: (a) introducing a recombinant expression vector comprising a nucleic acid encoding the variant into a population of cells (e.g., bacterial cells, such as *B. subtilis* cells); and (b) culturing the cells in a culture medium under conditions conducive to produce the variant encoded by the expression vector. Some such methods further comprise: (c) isolating the variant from the cells or from the culture medium.

A further embodiment is directed to a method of improving the cleaning performance or stability of a subtilisin comprising modifying a subtilisin to include one or more substitutions, or combination of substitutions, as provided herein.

Unless otherwise noted, all component or composition levels provided herein are made in reference to the active level of that component or composition, and are exclusive of impurities, for example, residual solvents or by-products, which may be present in commercially available sources. Enzyme components weights are based on total active protein. All percentages and ratios are calculated by weight unless otherwise indicated. All percentages and ratios are calculated based on the total composition unless otherwise indicated. Compositions described herein include cleaning compositions, such as detergent compositions. In the exemplified detergent compositions, the enzyme levels are expressed by pure enzyme by weight of the total composition and unless otherwise specified, the detergent ingredients are expressed by weight of the total compositions.

In one embodiment, one or more subtilisin variant described herein is useful in cleaning applications, such as, for example, but not limited to, cleaning dishware or tableware items, fabrics, medical instruments and items having hard surfaces (e.g., the hard surface of a table, table top, wall, furniture item, floor, and ceiling). In other embodiments, one or more subtilisin variant described herein is useful in disinfecting applications, such as, for example, but not limited to, disinfecting an automatic dishwashing or laundry machine.

Another embodiment is directed to a composition comprising one or more subtilisin variant described herein. In some embodiments, the composition is a cleaning composition. In other embodiments, the composition is a detergent composition. In yet other embodiments, the composition is selected from a laundry detergent composition, an automatic dishwashing (ADW) composition, a hand (manual) dishwashing detergent composition, a hard surface cleaning composition, an eyeglass cleaning composition, a medical instrument cleaning composition, a disinfectant (e.g., malodor or microbial) composition, and a personal care cleaning composition. In still other embodiments, the composition is a laundry detergent composition, an ADW composition, or a hand (manual) dishwashing detergent composition. Even still further embodiments are directed to fabric cleaning compositions, while other embodiments are directed to non-fabric cleaning compositions. In some embodiments, the cleaning composition is boron-free. In other embodiments, the cleaning composition is phosphate-free. In still other embodiments, the composition comprises one or more subtilisin variant described herein and one or more of an excipient, adjunct material, and/or additional enzyme.

Protease Stabilizer

Peptide aldehydes may be used as protease stabilizers in detergent formulations as previously described (WO199813458, WO2011036153, US20140228274). Examples of peptide aldehyde stabilizers are peptide aldehydes, ketones, or halomethyl ketones and might be 'N-capped' with for instance a ureido, a carbamate, or a urea moiety, or 'doubly N-capped' with for instance a carbonyl, a ureido, an oxiamide, a thioureido, a dithiooxamide, or a thiooxamide moiety (EP2358857B1). The molar ratio of these inhibitors to the protease may be 0.1:1 to 100:1, e.g. 0.5:1-50:1, 1:1-25:1 or 2:1-10:1. Other examples of protease stabilizers are benzophenone or benzoic acid anilide derivatives, which might contain carboxyl groups (U.S. Pat. No. 7,968,508 B2). The molar ratio of these stabilizers to protease is preferably in the range of 1:1 to 1000:1 in particular 1:1 to 500:1 especially preferably from 1:1 to 100:1, most especially preferably from 1:1 to 20:1.

Complexing Agent System

For the purpose of this disclosure, a "complexing agent" is a compound capable of binding polyvalent ions such as calcium, magnesium, lead, copper, zinc, cadmium, mercury, manganese, iron, aluminium and other cationic polyvalent ions to form a water-soluble complex. The complexing agent has a logarithmic stability constant ([log K]) for Ca2+ of at least 3. The stability constant, log K, is measured in a solution of ionic strength of 0.1, at a temperature of 25° C.

The composition preferably comprises from 10% to 50% by weight of the composition of a complexing agent system. The complexing agent system comprises one or more complexing agents selected from the group consisting of methyl glycine diacetic acid (MGDA), citric acid, glutamic-N,N-diacetic acid (GLDA), iminodisuccinic acid (IDS), carboxy methyl inulin, L-Aspartic acid N, N-diacetic acid tetrasodium salt (ASDA) and mixtures thereof. Preferably, the complexing agent system comprises at least 10% by weight of the composition of MGDA. The complexing system may additionally comprise a complexing agent selected from the group consisting of citric acid, (GLDA), (IDS), carboxy methyl inulin, L-Aspartic acid N, N-diacetic acid tetrasodium salt (ASDA) and mixtures thereof. Preferably the complexing agent system comprises at least 10% by weight of the composition of MGDA and at least 10% by weight of the composition of citric acid. For the purpose of this disclosure, the term "acid", when referring to complexing agents, includes the acid and salts thereof.

In a preferred embodiment, the composition comprises at least 15%, more preferably from 20% to 40% by weight of the composition of MGDA, more preferably the tri-sodium salt of MGDA. Compositions comprising this high level of MGDA perform well in hard water and also in long and/or hot cycles.

The complexing agent system can further comprise citric acid.

Dispersant Polymer

A dispersant polymer can be used in any suitable amount from about 0.1 to about 20%, preferably from 0.2 to about 15%, more preferably from 0.3 to % by weight of the composition.

The dispersant polymer is capable to suspend calcium or calcium carbonate in an automatic dishwashing process.

The dispersant polymer has a calcium binding capacity within the range between 30 to 250 mg of Ca/g of dispersant polymer, preferably between 35 to 200 mg of Ca/g of dispersant polymer, more preferably 40 to 150 mg of Ca/g of dispersant polymer at 25° C. In order to determine if a polymer is a dispersant polymer within the meaning of the present disclosure, the following calcium binding-capacity determination is conducted in accordance with the following instructions:

Calcium Binding Capacity Test Method

The calcium binding capacity referred to herein is determined via titration using a pH/ion meter, such as the Meettler Toledo SevenMulti™ bench top meter and a PerfectION™ comb Ca combination electrode. To measure the binding capacity a heating and stirring device suitable for beakers or tergotometer pots is set to 25° C., and the ion electrode with meter are calibrated according to the manufacturer's instructions. The standard concentrations for the electrode calibration should bracket the test concentration and should be measured at 25° C. A stock solution of 1000 mg/g of Ca is prepared by adding 3.67 g of $CaCl_2$-$2H_2O$ into 1 L of deionised water, then dilutions are carried out to prepare three working solutions of 100 mL each, respectively comprising 100 mg/g, 10 mg/g, and 1 mg/g concentrations of Calcium. The 100 mg Ca/g working solution is used as the initial concentration during the titration, which is conducted at 25° C. The ionic strength of each working solution is adjusted by adding 2.5 g/L of NaCl to each. The 100 mL of 100 mg Ca/g working solution is heated and stirred until it reaches 25° C. The initial reading of Calcium ion concentration is conducted at when the solution reaches 25° C. using the ion electrode. Then the test polymer is added incrementally to the calcium working solution (at 0.01 g/L intervals) and measured after 5 minutes of agitation following each incremental addition. The titration is stopped when the solution reaches 1 mg/g of Calcium. The titration procedure is repeated using the remaining two calcium concentration working solutions. The binding capacity of the test polymer is calculated as the linear slope of the calcium concentrations measured against the grams/L of test polymer that was added.

The dispersant polymer preferably bears a negative net charge when dissolved in an aqueous solution with a pH greater than 6.

The dispersant polymer can bear also sulfonated carboxylic esters or amides, in order to increase the negative charge at lower pH and improve their dispersing properties in hard water. The preferred dispersant polymers are sulfonated/carboxylated polymers, i.e., polymer comprising both sulfonated and carboxylated monomers.

Preferably, the dispersant polymers are sulfonated derivatives of polycarboxylic acids and may comprise two, three, four or more different monomer units. The preferred copolymers contain:

At least one structural unit derived from a carboxylic acid monomer having the general formula (III):

(III)

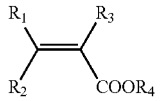

wherein $R_1$ to $R_3$ are independently selected from hydrogen, methyl, linear or branched saturated alkyl groups having from 2 to 12 carbon atoms, linear or branched mono or polyunsaturated alkenyl groups having from 2 to 12 carbon atoms, alkyl or alkenyl groups as aforementioned substituted with —NH2 or —OH, or —COOH, or $COOR_4$, where $R_4$ is selected from hydrogen, alkali metal, or a linear or branched, saturated or unsaturated alkyl or alkenyl group with 2 to 12 carbons;

Preferred carboxylic acid monomers include one or more of the following: acrylic acid, maleic acid, maleic anhydride, itaconic acid, citraconic acid, 2-phenylacrylic acid, cinnamic acid, crotonic acid, fumaric acid, methacrylic acid, 2-ethylacrylic acid, methylenemalonic acid, or sorbic acid. Acrylic and methacrylic acids being more preferred.

Optionally, one or more structural units derived from at least one nonionic monomer having the general formula (IV):

(IV)

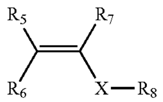

Wherein $R_5$ to $R_7$ are independently selected from hydrogen, methyl, phenyl or hydroxyalkyl groups containing 1 to 6 carbon atoms, and can be part of a cyclic structure, X is an optionally present spacer group which is selected from —$CH_2$—, —COO—, —CONH— or —$CONR_8$—, and $R_8$ is selected from linear or branched, saturated alkyl radicals having 1 to 22 carbon atoms or unsaturated, preferably aromatic, radicals having from 6 to 22 carbon atoms.

Preferred non-ionic monomers include one or more of the following: butene, isobutene, pentene, 2-methylpent-1-ene, 3-methylpent-1-ene, 2,4,4-trimethylpent-1-ene, 2,4,4-trimethylpent-2-ene, cyclopentene, methylcyclopentene, 2-methyl-3-methyl-cyclopentene, hexene, 2,3-dimethylhex-1-ene, 2,4-dimethylhex-1-ene, 2,5-dimethylhex-1-ene, 3,5-dimethylhex-1-ene, 4,4-dimethylhex-1-ene, cyclohexene, methylcyclohexene, cycloheptene, alpha olefins having 10 or more carbon atoms such as, dec-1-ene, dodec-1-ene, hexadec-1-ene, octadec-1-ene and docos-1-ene, preferred aromatic monomers are styrene, alpha methylstyrene, 3-methylstyrene, 4-dodecylstyrene, 2-ethyl-4-bezylstyrene, 4-cyclohexylstyrene, 4-propylstyrol, 1-vinylnaphtalene, 2-vinylnaphtalene; preferred carboxylic ester monomers are methyl (meth)acrylate, ethyl (meth)acrylate, propyl (meth) acrylate, t-butyl (meth)acrylate, pentyl (meth)acrylate, hexyl (meth)acrylate, 2-ethylhexyl (meth)acrylate, octyl (meth) acrylate, lauryl (meth)acrylate, stearyl (meth)acrylate and behenyl (meth)acrylate; preferred amides are N-methyl acrylamide, N-ethyl acrylamide, N-t-butyl acrylamide, N-2-ethylhexyl acrylamide, N-octyl acrylamide, N-lauryl acrylamide, N-stearyl acrylamide, N-behenyl acrylamide.

And at least one structural unit derived from at least one sulfonic acid monomer having the general formula (V) and (VI):

(V)

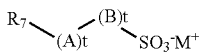

-continued (VI)

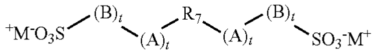

wherein $R_7$ is a group comprising at least one sp2 bond, A is O, N, P, S, an amido or ester linkage, B is a mono- or polycyclic aromatic group or an aliphatic group, each t is independently 0 or 1, and M+ is a cation. In one aspect, $R_7$ is a C2 to C6 alkene. In another aspect, R7 is ethene, butene or propene.

Preferred sulfonated monomers include one or more of the following: 1-acrylamido-1-propanesulfonic acid, 2-acrylamido-2-propanesulfonic acid, 2-acrylamido-2-methyl-1-propanesulfonic acid, 2-methacrylamido-2-methyl-1-propanesulfonic acid, 3-methacrylamido-2-hydroxy-propanesulfonic acid, allylsulfonic acid, methallylsulfonic acid, allyloxybenzenesulfonic acid, methallyloxybenzene-sulfonic acid, 2-hydroxy-3-(2-propenyloxy) propanesulfonic acid, 2-methyl-2-propen-1-sulfonic acid, styrenesulfonic acid, vinylsulfonic acid, 3-sulfopropyl, 3-sulfo-propylmethacrylate, sulfomethacrylamide, sulfomethylmethacrylamide and mixtures of said acids or their water-soluble salts.

Preferably, the polymer comprises the following levels of monomers: from about 40 to about 90%, preferably from about 60 to about 90% by weight of the polymer of one or more carboxylic acid monomer; from about 5 to about 50%, preferably from about 10 to about 40% by weight of the polymer of one or more sulfonic acid monomer; and optionally from about 1% to about 30%, preferably from about 2 to about 20% by weight of the polymer of one or more non-ionic monomer.

An especially preferred polymer comprises about 70% to about 80% by weight of the polymer of at least one carboxylic acid monomer and from about 20% to about 30% by weight of the polymer of at least one sulfonic acid monomer.

In the polymers, all or some of the carboxylic or sulfonic acid groups can be present in neutralized form, i.e. the acidic hydrogen atom of the carboxylic and/or sulfonic acid group in some or all acid groups can be replaced with metal ions, preferably alkali metal ions and in particular with sodium ions.

The carboxylic acid is preferably (meth)acrylic acid. The sulfonic acid monomer is preferably 2-acrylamido-2-propanesulfonic acid (AMPS).

Preferred commercial available polymers include: Alcosperse 240, Aquatreat AR 540 and Aquatreat MPS supplied by Alco Chemical; Acumer 3100, Acumer 2000, Acusol 587G and Acusol 588G supplied by Rohm & Haas; Goodrich K-798, K-775 and K-797 supplied by BF Goodrich; and ACP 1042 supplied by ISP technologies Inc. Particularly preferred polymers are Acusol 587G and Acusol 588G supplied by Rohm & Haas.

Suitable dispersant polymers include anionic carboxylic polymer of low molecular weight. They can be homopolymers or copolymers with a weight average molecular weight of less than or equal to about 200,000 g/mol, or less than or equal to about 75,000 g/mol, or less than or equal to about 50,000 g/mol, or from about 3,000 to about 50,000 g/mol, preferably from about 5,000 to about 45,000 g/mol. The dispersant polymer may be a low molecular weight homopolymer of polyacrylate, with an average molecular weight of from 1,000 to 20,000, particularly from 2,000 to 10,000, and particularly preferably from 3,000 to 5,000.

The dispersant polymer may be a copolymer of acrylic with methacrylic acid, acrylic and/or methacrylic with maleic acid, and acrylic and/or methacrylic with fumaric acid, with a molecular weight of less than 70,000. Their molecular weight ranges from 2,000 to 80,000 and more preferably from 20,000 to 50,000 and in particular 30,000 to 40,000 g/mol. and a ratio of (meth)acrylate to maleate or fumarate segments of from 30:1 to 1:2.

The dispersant polymer may be a copolymer of acrylamide and acrylate having a molecular weight of from 3,000 to 100,000, alternatively from 4,000 to 20,000, and an acrylamide content of less than 50%, alternatively less than 20%, by weight of the dispersant polymer can also be used. Alternatively, such dispersant polymer may have a molecular weight of from 4,000 to 20,000 and an acrylamide content of from 0% to 15%, by weight of the polymer.

Dispersant polymers suitable herein also include itaconic acid homopolymers and copolymers.

Alternatively, the dispersant polymer can be selected from the group consisting of alkoxylated polyalkyleneimines, alkoxylated polycarboxylates, polyethylene glycols, styrene co-polymers, cellulose sulfate esters, carboxylated polysaccharides, amphiphilic graft copolymers and mixtures thereof.

Bleaching System

The composition preferably comprises a bleaching system comprising a high level of bleach, preferably percarbonate in combination with a bleach activator or a bleach catalyst or both. Preferably the bleach activator is TAED and the bleach catalyst is a manganese bleach catalyst.

Bleach

The composition preferably comprises from about 10 to about 20%, more preferably from about 12 to about 18% of bleach, preferably percarbonate, by weight of the composition.

Due to the improved stability of the variant, the composition can comprise more potent and aggressive bleach (e.g. high levels of bleach catalysts can be used). Less stable bleaches (e.g. percarbonate particles having less coating) may also be used in the composition.

Inorganic and organic bleaches are suitable for use herein. Inorganic bleaches include perhydrate salts such as perborate, percarbonate, perphosphate, persulfate and persilicate salts. The inorganic perhydrate salts are normally the alkali metal salts. The inorganic perhydrate salt may be included as the crystalline solid without additional protection. Alternatively, the salt can be coated. Suitable coatings include sodium sulphate, sodium carbonate, sodium silicate and mixtures thereof. Said coatings can be applied as a mixture applied to the surface or sequentially in layers.

Alkali metal percarbonates, particularly sodium percarbonate is the preferred bleach for use herein. The percarbonate is most preferably incorporated into the products in a coated form which provides in-product stability.

Potassium peroxymonopersulfate is another inorganic perhydrate salt of utility herein. Typical organic bleaches are organic peroxyacids, especially dodecanediperoxoic acid, tetradecanediperoxoic acid, and hexadecanediperoxoic acid. Mono- and diperazelaic acid, mono- and diperbrassylic acid are also suitable herein. Diacyl and Tetraacylperoxides, for instance dibenzoyl peroxide and dilauroyl peroxide, are other organic peroxides that can be used in the context of this disclosure.

Further typical organic bleaches include the peroxyacids, particular examples being the alkylperoxy acids and the arylperoxy acids. Preferred representatives are (a) peroxybenzoic acid and its ring-substituted derivatives, such as alkylperoxybenzoic acids, but also peroxy-α-naphthoic acid and magnesium monoperphthalate, (b) the aliphatic or substituted aliphatic peroxy acids, such as peroxylauric acid, peroxystearic acid, F-phthalimidoperoxycaproic acid[phthaloiminoperoxyhexanoic acid (PAP)], o-carboxybenzamidoperoxycaproic acid, N-nonenylamidoperadipic acid and N-nonenylamidopersuccinates, and (c) aliphatic and araliphatic peroxydicarboxylic acids, such as 1,12-diperoxycarboxylic acid, 1,9-diperoxyazelaic acid, diperoxysebacic acid, diperoxybrassylic acid, the diperoxyphthalic acids, 2-decyldiperoxybutane-1,4-dioic acid, N,N-terephthaloyldi (6-aminopercaproic acid).

Bleach Activators

Bleach activators are typically organic peracid precursors that enhance the bleaching action in the course of cleaning at temperatures of 60° C. and below. Bleach activators suitable for use herein include compounds which, under perhydrolysis conditions, give aliphatic peroxoycarboxylic acids having preferably from 1 to 12 carbon atoms, in particular from 2 to 10 carbon atoms, and/or optionally substituted perbenzoic acid. Suitable substances bear O-acyl and/or N-acyl groups of the number of carbon atoms specified and/or optionally substituted benzoyl groups. Preference is given to polyacylated alkylenediamines, in particular tetraacetylethylenediamine (TAED), acylated triazine derivatives, in particular 1,5-diacetyl-2,4-dioxohexahydro-1,3,5-triazine (DADHT), acylated glycolurils, in particular tetraacetylglycoluril (TAGU), N-acylimides, in particular N-nonanoylsuccinimide (NOSI), acylated phenolsulfonates, in particular n-nonanoyl- or isononanoyloxybenzenesulfonate (n- or iso-NOBS), decanoyloxybenzoic acid (DOBA), carboxylic anhydrides, in particular phthalic anhydride, acylated polyhydric alcohols, in particular triacetin, ethylene glycol diacetate and 2,5-diacetoxy-2,5-dihydrofuran and also triethylacetyl citrate (TEAC). If present the composition comprises from 0.01 to 5, preferably from 0.2 to 2% by weight of the composition of bleach activator, preferably TAED.

Bleach Catalyst

The composition herein preferably contains a bleach catalyst, preferably a metal containing bleach catalyst. More preferably the metal containing bleach catalyst is a transition metal containing bleach catalyst, especially a manganese or cobalt-containing bleach catalyst.

Bleach catalysts preferred for use herein include manganese triazacyclononane and related complexes; Co, Cu, Mn and Fe bispyridylamine and related complexes; and pentamine acetate cobalt (III) and related complexes. Especially preferred bleach catalyst for use herein are 1,4,7-trimethyl-1,4,7-triazacyclononane (Me-TACN) and 1,2, 4,7-tetramethyl-1,4,7-triazacyclononane (Me/Me-TACN). Especially preferred composition for use herein comprises 1,4,7-trimethyl-1,4,7-triazacyclononane (Me-TACN) and/or 1,2, 4,7-tetramethyl-1,4,7-triazacyclononane (Me/Me-TACN).

Preferably the composition comprises from 0.001 to 0.5, more preferably from 0.002 to 0.1%, more preferably from 0.005 to 0.075% of bleach catalyst by weight of the composition. Preferably the bleach catalyst is a manganese bleach catalyst.

Inorganic Builder

The composition preferably comprises an inorganic builder. Suitable inorganic builders are selected from the group consisting of carbonate, silicate and mixtures thereof. Especially preferred for use herein is sodium carbonate. Preferably the composition comprises from 5 to 60%, more preferably from 10 to 50% and especially from 15 to 45% of sodium carbonate by weight of the composition.

Surfactant

Surfactants suitable for use herein include non-ionic surfactants, preferably the compositions are free of any other surfactants. Traditionally, non-ionic surfactants have been used in automatic dishwashing for surface modification purposes in particular for sheeting to avoid filming and spotting and to improve shine. It has been found that non-ionic surfactants can also contribute to prevent redeposition of soils.

Preferably the composition comprises a non-ionic surfactant or a non-ionic surfactant system, more preferably the non-ionic surfactant or a non-ionic surfactant system has a phase inversion temperature, as measured at a concentration of 1% in distilled water, between 40 and 70° C., preferably between 45 and 65° C. By a “non-ionic surfactant system” is meant herein a mixture of two or more non-ionic surfactants. Preferred for use herein are non-ionic surfactant systems. They seem to have improved cleaning and finishing properties and better stability in product than single non-ionic surfactants.

Phase inversion temperature is the temperature below which a surfactant, or a mixture thereof, partitions preferentially into the water phase as oil-swollen micelles and above which it partitions preferentially into the oil phase as water swollen inverted micelles. Phase inversion temperature can be determined visually by identifying at which temperature cloudiness occurs.

The phase inversion temperature of a non-ionic surfactant or system can be determined as follows: a solution containing 1% of the corresponding surfactant or mixture by weight of the solution in distilled water is prepared. The solution is stirred gently before phase inversion temperature analysis to ensure that the process occurs in chemical equilibrium. The phase inversion temperature is taken in a thermostable bath by immersing the solutions in 75 mm sealed glass test tube. To ensure the absence of leakage, the test tube is weighed before and after phase inversion temperature measurement. The temperature is gradually increased at a rate of less than 1° C. per minute, until the temperature reaches a few degrees below the pre-estimated phase inversion temperature. Phase inversion temperature is determined visually at the first sign of turbidity.

Suitable nonionic surfactants include: i) ethoxylated non-ionic surfactants prepared by the reaction of a monohydroxy alkanol or alkyphenol with 6 to 20 carbon atoms with preferably at least 12 moles particularly preferred at least 16 moles, and still more preferred at least 20 moles of ethylene oxide per mole of alcohol or alkylphenol; ii) alcohol alkoxylated surfactants having a from 6 to 20 carbon atoms and at least one ethoxy and propoxy group. Preferred for use herein are mixtures of surfactants i) and ii).

Other suitable non-ionic surfactants are epoxy-capped poly (oxyalkylated) alcohols represented by the formula:

$$R1O[CH2CH(CH3)O]x[CH2CH2O]y[CH2CH(OH)R2] \quad (I)$$

wherein R1 is a linear or branched, aliphatic hydrocarbon radical having from 4 to 18 carbon atoms; R2 is a linear or branched aliphatic hydrocarbon radical having from 2 to 26 carbon atoms; x is an integer having an average value of from 0.5 to 1.5, more preferably about 1; and y is an integer having a value of at least 15, more preferably at least 20.

Preferably, the surfactant of formula I, at least about 10 carbon atoms in the terminal epoxide unit [CH2CH(OH) R2]. Suitable surfactants of formula I, according to the present disclosure, are Olin Corporation's POLY-TER- GENT® SLF-18B nonionic surfactants, as described, for example, in WO 94/22800, published Oct. 13, 1994 by Olin Corporation.

Enzymes

Other Proteases

The composition can comprise an additional protease. A mixture of two or more proteases can contribute to an enhanced cleaning across a broader temperature, cycle duration, and/or substrate range, and provide superior shine benefits, especially when used in conjunction with an anti-redeposition agent and/or a sulfonated polymer.

Suitable proteases for use in combination with the variant proteases of the present disclosure include metalloproteases and serine proteases, including neutral or alkaline microbial serine proteases, such as subtilisins (EC 3.4.21.62). Suitable proteases include those of animal, vegetable or microbial origin. In one aspect, such suitable protease may be of microbial origin. The suitable proteases include chemically or genetically modified mutants of the aforementioned suitable proteases. In one aspect, the suitable protease may be a serine protease, such as an alkaline microbial protease or/and a trypsin-type protease. Examples of suitable neutral or alkaline proteases include:

(a) subtilisins (EC 3.4.21.62), especially those derived from *Bacillus*, such as *Bacillus* sp., *B. lentus, B. alkalophilus, B. subtilis, B. amyloliquefaciens, B. pumilus, B. gibsonii*, and *B. akibaii* described in WO2004067737, WO2015091989, WO2015091990, WO2015024739, WO2015143360, U.S. Pat. No. 6,312,936 B1, U.S. Pat. Nos. 5,679,630, 4,760,025, WO03/055974, WO03/054185, WO03/054184, WO2017/215925, DE102006022216A1, WO2015089447, WO2015089441, WO2016066756, WO2016066757, WO2016069557, WO2016069563, WO2016069569, WO2016174234, WO2017/089093, WO2020/156419, WO2016/183509. Specifically, mutations S9R, A15T, V66A, A188P, V199I, N212D, Q239R, N255D, X9E, X200L, X256E, X9R, X19L, X60D (Savinase numbering system); subtilisins from *B. pumilus* such as the ones described in DE102006022224A1, WO2020/221578, WO2020/221579, WO2020/221580, including variants comprising amino acid substitutions in at least one or more of the positions selected from 9, 130, 133, 144, 224, 252, 271 (BPN' numbering system).

(b) trypsin-type or chymotrypsin-type proteases, such as trypsin (e.g., of porcine or bovine origin), including the *Fusarium* protease described in WO 89/06270 and the chymotrypsin proteases derived from Cellumonas described in WO 05/052161 and WO 05/052146.

(c) metalloproteases, especially those derived from *Bacillus amyloliquefaciens* described in WO07/044993A2; from *Bacillus, Brevibacillus, Thermoactinomyces, Geobacillus, Paenibacillus*, Lysinibacillus or *Streptomyces* spp. Described in WO2014194032, WO2014194054 and WO2014194117; from *Kribella alluminosa* described in WO2015193488; and from *Streptomyces* and Lysobacter described in WO2016075078.

(d) protease having at least 90% identity to the subtilase from *Bacillus* sp. TY145, NCIMB 40339, described in WO92/17577 (Novozymes A/S), including the variants of this *Bacillus* sp TY145 subtilase described in WO2015024739, and WO2016066757.

Especially preferred additional proteases for the composition are variants of a parent protease wherein the parent protease demonstrates at least 90%, preferably at least 95%, more preferably at least 98%, even more preferably at least 99% and especially 100% identity with SEQ ID NO:2, and the variant comprises substitutions in one or more, or two or more or three or more of the following positions versus SEQ ID NO:2:

S3V, S9R, A13V, A15T, G20*, L21F, I35V, N60D, V66A, N74D, S85N/R, S97SE, S97AD, S97D/G, S99G/M/D/E, S101A, V102E/I, G116V/R, S126F/L, P127Q, S128A, S154D, G157S, Y161A, R164S, A188P, V199I, Q200C/E/I/K/T/V/W/L, Y203W, N212D, M216S/F, A222V, Q239R/F, T249R, N255D and L256E/N/Q/D Preferred proteases include those with at least 90%, preferably at least 95% identity to SEQ ID NO:2 comprising the following mutations:

S9R+A13V+A15T+135V+N60D+Q239F; or
S9R+A15T+G20*+L21F+N60D+Q239N; or
S9R+A15T+V66A+S97G+A222V+Q239R+N255D; or
S9R+A15T+V66A+N74D+Q239R; or
S9R+A15T+V66A+N212D+Q239R; or
S99SE; or
S99AD; or
N74D+S85R+G116R+S126L+P127Q+S128A; or
N74D+S85R+G116R+S126L+P127Q+S128A+S182D+V238R; or
G116V+S126L+P127Q+S128A; or
S99M+G116V+S126L+P127Q+S128A.

Suitable commercially available additional protease enzymes include those sold under the trade names Alcalase®, Savinase®, Primase®, Durazym®, Polarzyme®, Kannase®, Liquanase®, Liquanase Ultra®, Savinase Ultra®, Liquanase® Evity®, Savinase® Evity®, Ovozyme®, Neutrase®, Everlase®, Coronase®, Blaze®, Blaze Ultra®, Blaze® Evity®, Blaze® Exceed, Blaze® Pro, Esperase®, Progress® Uno, Progress® Excel, Progress® Key, Ronozyme®, Vinzon® and Het Ultra® by Novozymes A/S (Denmark);

those sold under the tradename Maxatase®, Maxacal®, Maxapem®, Properase®, Purafect®, Purafect Prime®, Purafect Ox®, FN3®, FN4®, Excellase®, Ultimase® and Purafect OXP® by Dupont; those sold under the tradename Opticlean® and Optimase® by Solvay Enzymes; and those available from Henkel/Kemira, namely BLAP (sequence shown in FIG. 29 of U.S. Pat. No. 5,352,604 with the following mutations S99D+S101 R+S103A+V104I+G159S, hereinafter referred to as BLAP), BLAP R (BLAP with S3T+V4I+V199M+V205I+L217D), BLAP X (BLAP with S3T+V4I+V205I) and BLAP F49 (BLAP with S3T+V4I+A194P+V199M+V205I+L217D); and can optionally comprise at least one further mutation 101E/D, S156D, L262; KAP (*Bacillus alkalophilus* subtilisin with mutations A230V+S256G+S259N) from Kao and Lavergy®, Lavergy® Pro, Lavergy® C Bright from BASF.

Especially preferred for use herein in combination with the variant protease of the present disclosure are commercial proteases selected from the group consisting of Properase®, Blaze®, Ultimase®, Everlase, Savinase®, Savinase Evity®, Savinase Ultra®, Excellase®, Ovozyme®, Coronase®, Blaze Ultra®, Blaze Evity® and Blaze Pro®, BLAP and BLAP variants.

Preferred levels of protease in the product include from about 0.05 to about 10, more preferably from about 0.5 to about 7 and especially from about 1 to about 6 mg of active protease/g of composition.

Amylases

Preferably the composition may comprise an amylase. Suitable alpha-amylases include those of bacterial or fungal origin. Chemically or genetically modified mutants (variants) are included. A preferred alkaline alpha-amylase is derived from a strain of *Bacillus*, such as *Bacillus licheniformis, Bacillus amyloliquefaciens, Bacillus stearothermophilus, Bacillus subtilis*, or other *Bacillus* sp., such as *Bacillus* sp. NCBI 12289, NCBI 12512, NCBI 12513, DSM 9375 (U.S. Pat. No. 7,153,818) DSM 12368, DSMZ no. 12649, KSM AP1378 (WO 97/00324), KSM K36 or KSM K38 (EP 1,022,334). Preferred amylases include:

A suitable amylase is a recombinant, non-naturally-occurring variant of a parent alpha-amylase, the variant alpha-amylase having 95% identity to SEQ ID NO: 5 and having amino acid substitutions at positions 51 and 125 with respect to SEQ ID NO: 5. The variant alpha-amylase may have amino acid substitutions that are T51V and S125R with respect to SEQ ID NO: 5. The variant alpha-amylase may further have amino acid substitution at positions 172, 227 or 231 with respect to SEQ ID NO: 5. The variant alpha-amylase may further have the amino acid substitutions N172Q, N227R or F231L with respect to SEQ ID NO: 5.

One suitable amylase is a recombinant, non-naturally-occurring variant of a parent alpha-amylase, the variant alpha-amylase having 95% identity to SEQ ID NO: 5 and having the amino acid substitution:

(a) T51V+S125R+F231L;
(b) T51V+S125R+N172Q+N227R;
(c) N029Q+T051V+T244I+S253L+K268R+K319R+S418A; or
(d) E415G, with respect to SEQ ID NO: 5.

Other preferred amylases include:

(a) variants described in WO 96/23873, WO00/60060, WO06/002643 and WO2017/192657, especially the variants with one or more substitutions in the following positions versus the AA560 enzyme listed as SEQ ID NO. 12 in WO06/002643:

26, 30, 33, 82, 37, 106, 118, 128, 133, 149, 150, 160, 178, 182, 186, 193, 202, 214, 231, 246, 256, 257, 258, 269, 270, 272, 283, 295, 296, 298, 299, 303, 304, 305, 311, 314, 315, 318, 319, 339, 345, 361, 378, 383, 419, 421, 437, 441, 444, 445, 446, 447, 450, 461, 471, 482, 484, preferably that also contain the deletions of D183* and G184*.

(b) variants exhibiting at least 90% identity with SEQ ID No. 4 in WO06/002643, the wild-type enzyme from *Bacillus* SP722, especially variants with deletions in the 183 and 184 positions and variants described in WO2000/60060, WO2011/100410 and WO2013/003659 which are incorporated herein by reference.

(c) variants exhibiting at least 95% identity with the wild-type enzyme from *Bacillus* sp.707 (SEQ ID NO:7 in U.S. Pat. No. 6,093,562), especially those comprising one or more of the following mutations M202, M208, S255, R172, and/or M261. Preferably said amylase comprises one or more of M202L, M202V, M202S, M202T, M202I, M202Q, M202W, S255N and/or R172Q. Particularly 25 preferred are those comprising the M202L or M202T mutations.

(d) variants described in WO 09/149130, preferably those exhibiting at least 90% identity with SEQ ID NO: 1 or SEQ ID NO:2 in WO 09/149130, the wild-type enzyme from *Geobacillus* Stearophermophilus or a truncated version thereof.

(e) variants exhibiting at least 89% identity with SEQ ID NO:1 in WO2016091688, especially those comprising deletions at positions H183+G184 and additionally one or more mutations at positions 405, 421, 422 and/or 428.

(f) variants exhibiting at least 60% amino acid sequence identity with the "PcuAmyl α-amylase" from *Paenibacillus curdlanolyticus* YK9 (SEQ ID NO:3 in WO2014099523).

(g) variants exhibiting at least 60% amino acid sequence identity with the "CspAmy2 amylase" from Cytophaga sp. (SEQ ID NO:1 in WO2014164777).

(h) variants exhibiting at least 85% identity with AmyE from *Bacillus subtilis* (SEQ ID NO:1 in WO2009149271).

(i) variants exhibiting at least 90% identity with the wild-type amylase from *Bacillus* sp. KSM-K38 with accession number AB051102.

(j) variants exhibiting at least 90%, preferably at least 95%, preferably at least 98% identity with the mature amino acid sequence of AAI10 from *Bacillus* sp (SEQ ID NO:7 in WO2016180748).

(k) variants exhibiting at least 80% identity with the mature amino acid sequence of *Alicyclobacillus* sp. amylase (SEQ ID NO:8 in WO2016180748).

Preferably the amylase is an engineered enzyme, wherein one or more of the amino acids prone to bleach oxidation have been substituted by an amino acid less prone to oxidation. In particular it is preferred that methionine residues are substituted with any other amino acid. In particular it is preferred that the methionine most prone to oxidation is substituted. Preferably the methionine in a position equivalent to 202 in the AA560 enzyme listed as SEQ ID NO. 12 in WO06/002643 is substituted. Preferably, the methionine at this position is substituted with threonine or leucine, preferably leucine.

Suitable commercially available alpha-amylases include DURAMYL®, LIQUEZYME®, TERMAMYL®, TERMAMYL ULTRA®, NATALASE®, SUPRAMYL®, STAINZYME®, STAINZYME PLUS®, FUNGAMYL®, ATLANTIC®, INTENSA® and BAN® (Novozymes A/S, Bagsvaerd, Denmark), KEMZYM® AT 9000 Biozym Biotech Trading GmbH Wehlistrasse 27b A-1200 Wien Austria, RAPIDASE®, PURASTAR®, ENZYSIZE®, OPTISIZE HT PLUS®, POWERASE®, PREFERENZ S® series (including PREFERENZ S1000® and PREFERENZ S2000® and PURASTAR OXAM® (DuPont., Palo Alto, California) and KAM® (Kao, 14-10 Nihonbashi Kayabacho, 1-chome, Chuo-ku Tokyo 103-8210, Japan). In one aspect, suitable amylases include ATLANTIC®, STAINZYME®, POWERASE®, INTENSA® and STAINZYME PLUS® and mixtures thereof.

Preferably, the composition comprises at least 0.01 mg, preferably from about 0.05 to about 10, more preferably from about 0.1 to about 6, especially from about 0.2 to about 5 mg of active amylase/g of composition.

Preferably, the protease and/or amylase of the composition are in the form of granulates, the granulates comprise more than 29% of sodium sulfate by weight of the granulate and/or the sodium sulfate and the active enzyme (protease and/or amylase) are in a weight ratio of between 3:1 and 100:1 or preferably between 4:1 and 30:1 or more preferably between 5:1 and 20:1.

Crystal Growth Inhibitor

Crystal growth inhibitors are materials that can bind to calcium carbonate crystals and prevent further growth of species such as aragonite and calcite.

Examples of effective crystal growth inhibitors include phosphonates, polyphosphonates, inulin derivatives, polyitaconic acid homopolymers and cyclic polycarboxylates.

Suitable crystal growth inhibitors may be selected from the group comprising HEDP (1-hydroxyethylidene 1,1-diphosphonic acid), carboxymethylinulin (CMI), tricarballylic acid and cyclic carboxylates. For the purposes of this disclosure the term carboxylate covers both the anionic form and the protonated carboxylic acid form.

Cyclic carboxylates contain at least two, preferably three or preferably at least four carboxylate groups and the cyclic structure is based on either a mono- or bi-cyclic alkane or a heterocycle. Suitable cyclic structures include cyclopropane, cyclobutane, cyclohexane or cyclopentane or cycloheptane, bicyclo-heptane or bicyclo-octane and/or tetrhaydrofuran. One preferred crystal growth inhibitor is cyclopentane tetracarboxylate.

Cyclic carboxylates having at least 75%, preferably 100% of the carboxylate groups on the same side, or in the "cis" position of the 3D-structure of the cycle are preferred for use herein.

It is preferred that the two carboxylate groups, which are on the same side of the cycle are in directly neighbouring or "ortho" positions.

Preferred crystal growth inhibitors include HEDP, tricarballylic acid, tetrahydrofurantetracarboxylic acid (THFTCA) and cyclopentanetetracarboxylic acid (CPTCA). The THFTCA is preferably in the 2c,3t,4t,5c-configuration, and the CPTCA in the cis,cis,cis,cis-configuration. Especially preferred crystal growth inhibitor for use herein is HEDP.

Also, preferred for use herein are partially decarboxylated polyitaconic acid homopolymers, preferably having a level of decarboxylation is in the range of 50 mole % to 90 mole %. Especially preferred polymer for use herein is Itaconix TSI® provided by Itaconix. The crystal growth inhibitors are present preferably in a quantity from about 0.01 to about 10%, particularly from about 0.02 to about 5% and in particular, from 0.05 to 3% by weight of the composition.

Metal Care Agents

Metal care agents may prevent or reduce the tarnishing, corrosion or oxidation of metals, including aluminium, stainless steel and non-ferrous metals, such as silver and copper. Preferably the composition comprises from 0.1 to 5%, more preferably from 0.2 to 4% and especially from 0.3 to 3% by weight of the product of a metal care agent, preferably the metal care agent is benzo triazole (BTA).

Glass Care Agents

Glass care agents protect the appearance of glass items during the dishwashing process.

Preferably the composition comprises from 0.1 to 5%, more preferably from 0.2 to 4% and specially from 0.3 to 3% by weight of the composition of a metal care agent, preferably the glass care agent is a zinc containing material, specially hydrozincite. Other suitable glass care agents are polyethyleneimine (PEI). A particularly preferred PEI is Lupasol® FG, supplied by BASF.

pH

The automatic dishwashing composition preferably has a pH as measured in 1% weight/volume aqueous solution in distilled water at 20° C. of from about 9 to about 12, more preferably from about 10 to less than about 11.5 and especially from about 10.5 to about 11.5.

Reserve Alkalinity

The automatic dishwashing composition preferably has a reserve alkalinity of from about 10 to about 20, more preferably from about 12 to about 18 at a pH of 9.5 as measured in NaOH with 100 grams of product at 20° C.

Wash Conditions

There are a variety of wash conditions including varying detergent formulations, wash water volumes, wash water temperatures, and lengths of wash time to which one or more subtilisin variant described herein may be exposed. A low detergent concentration system is directed to wash water containing less than about 800 ppm detergent components. A medium detergent concentration system is directed to wash containing between about 800 ppm and about 2000 ppm detergent components. A high detergent concentration system is directed to wash water containing greater than about 2000 ppm detergent components. In some embodiments, the "cold water washing" of the present disclosure utilizes "cold water detergent" suitable for washing at temperatures from about 10° C. to about 40° C., from about 20° C. to about 30° C., or from about 15° C. to about 25° C., as well as all other combinations within the range of about 15° C. to about 35° C. or 10° C. to 40° C.

Different geographies have different water hardness. Hardness is a measure of the amount of calcium ($Ca^{2+}$) and magnesium ($Mg^{2+}$) in the water. Water hardness is usually described in terms of the grains per gallon (gpg) mixed $Ca^{2+}/Mg^{2+}$. Most water in the United States is hard, but the degree of hardness varies. Moderately hard (60-120 ppm) to hard (121-181 ppm) water has 60 to 181 ppm (ppm can be converted to grains per U.S. gallon by dividing ppm by 17.1) of hardness minerals.

| Water | Grains per gallon | Parts per million |
|---|---|---|
| Soft | less than 1.0 | less than 17 |
| Slightly hard | 1.0 to 3.5 | 17 to 60 |
| Moderately hard | 3.5 to 7.0 | 60 to 120 |
| Hard | 7.0 to 10.5 | 120 to 180 |
| Very hard | greater than 10.5 | greater than 180 |

EMBODIMENTS OF THE PRESENT DISCLOSURE

The following are embodiments of the present disclosure

1. An automatic dishwashing composition comprising a surfactant and a protease,
   wherein the automatic dishwashing composition is in the form of a water-soluble unit-dose pouch comprising a compartment, wherein the compartment comprises both a powder component and a gel component,
   wherein the protease is a subtilisin variant that comprises:
   (i) a mutation at position 122; and
   (ii) one or more mutations at positions 126, 127, 128, 211 and 212,
   with reference to SEQ ID NO: 1,
   and wherein the variant has at least 80% identity to the amino acid sequence of SEQ ID NO: 1.
2. A composition according to embodiment 1, wherein the composition is in the form of a multi-compartment pouch that comprises two or more compartments, preferably three or more compartments.
3. A composition according to any preceding embodiment, wherein the protease is present in the gel component.
4. A composition according to any preceding embodiment, wherein the composition comprises a bleach, wherein the bleach is present in the powder component.
5. A composition according to any preceding embodiment, wherein the variant comprises
   (i) the mutation at position M122L; and
   (ii) one or more mutations at positions 126, 127, 128, 211 and 212, 6. A composition according to any preceding embodiment, wherein the variant comprises two or more mutations at positions 126, 127, 128, 211 and 212, preferably three or more mutations at positions 126, 127, 128, 211 and 212, preferably four or more mutations at positions 126, 127, 128, 211 and 212, preferably five mutations at positions 126, 127, 128, 211 and 212.
7. A composition according to any preceding embodiment, wherein the variant comprises one or more mutations selected from S126A, D127E, F128G, M211Q and N212Q, preferably two or more mutations selected from S126A, D127E, F128G, M211Q and N212Q, preferably three or more mutations selected from S126A, D127E, F128G, M211Q and N212Q, preferably four or more mutations selected from S126A, D127E, F128G, M211Q and N212Q, preferably five mutations selected from S126A, D127E, F128G, M211Q and N212Q.
8. A composition according to any preceding embodiment, wherein the variant comprises the mutations M122L, S126A, D127E, F128G, M211Q and N212Q,
9. A composition according to any preceding embodiment, wherein the variant comprises an amino acid sequence having at least 85%, 90%, 91%, 92%, 93%, 94%, 95%, 96%, 97%, 98%, or 99% sequence identity to the amino acid sequence of SEQ ID NO: 1.
10. A composition according to any preceding embodiment, wherein the variant is derived from a parent or reference polypeptide with 60%, 65%, 70%, 75%, 80%, 85%, 86%, 87%, 88%, 89%, 90%, 91%, 92%, 93%, 94%, 95%, 96%, 97%, 98%, 99%, or 100% amino acid sequence identity to SEQ ID NO: 1.
11. A composition according to any preceding embodiment, wherein the composition comprises a manganese bleach catalyst selected from the group consisting of 1,4,7-trimethyl-1,4,7-triazacyclononane (Me-TACN), 1,2, 4,7-tetramethyl-1,4,7-triazacyclononane (Me/Me-TACN) and mixtures thereof.
12. A composition according to any preceding embodiment, wherein the composition comprises one or more other enzymes selected from acyl transferases, amylases, alpha-amylases, beta-amylases, alpha-galactosidases, arabinases, arabinosidases, aryl esterases, beta-galactosidases, beta-glucanases, carrageenases, catalases, cellulases, chondroitinases, cutinases, dispersins, endo-glucanases, endo-beta-mannanases, exo-beta-mannanases, esterases, exo-mannanases, galactanases, glucoamylases, hemicellulases, hexosaminidase, hyaluronidases, keratinases, laccases, lactases, ligninases, lipases, lipolytic enzymes, lipoxygenases, lysozyme, mannanases, metalloproteases, nucleases, oxidases, oxidoreductases, pectate lyases, pectin acetyl esterases, pectinases, pentosanases, perhydrolases, peroxidases, PETases, phenoloxidases, phosphatases, phospholipases, phytases, polyesterases, polygalacturonases, additional proteases, pullulanases, reductases, rhamnogalacturonases, tannases, transglutaminases, xylan acetyl-esterases, xylanases, and xylosidases; and combinations thereof.
13. A composition according to embodiment 12, wherein the one or more enzymes comprises an amylase selected from the group consisting of AA707, AA560, AAI10, SP722, BspAmy24, and CspAmy1, and variants thereof, and combinations thereof.
14. A composition according to embodiment 13, wherein the one or more enzymes comprises a recombinant, non-naturally-occurring variant of a parent alpha-amylase, the variant alpha-amylase having 95% identity to SEQ ID NO: 3 and having amino acid substitutions at positions 51 and 125 with respect to SEQ ID NO: 3.

EXAMPLES

Example 1

Expression of BG46 Subtilisin Variants

The *Bacillus gibsonii* Bgi02446 wildtype subtilisin (BG46) is provided in SEQ ID NO:1. In this study, a BG46 subtilisin variant with the substitutions S039E, S099R, S126A, D127E, and F128G (SEQ ID NO:2) was used as the starting point in the engineering of further substituted variants, and is referred to as BG46+S039E-S099R-S126A-D127E-F128G. All BG46 subtilisin variants were expressed using a DNA fragment comprising: a 5'AprE flanking region that contains a variant of the *B. subtilis* rrnlp2 promoter sequence (SEQ ID NO:3) (the *B. subtilis* rrnIp2 promoter and engineered variant are more fully described in patent application WO2020112609), the nucleotide sequence encoding the aprE signal peptide sequence (SEQ ID NO:4), the nucleotide sequence encoding the *B. lentus* propeptide (SEQ ID NO:5), the sequence corresponding to the gene encoding the mature BG46 subtilisins, the BPN' terminator (SEQ ID NO:6), the 3'AprE flanking sequences including a kanamycin resistance gene expression cassette (SEQ ID NO:7), in consecutive order. This DNA fragment was assembled using standard molecular biology techniques. Linear DNA of expression cassettes were used to transform competent *B. subtilis* cells of a suitable strain.

The transformation mixtures were plated onto LA plates containing 1.6% skim milk and 1.8 ppm kanamycin and incubated overnight at 37° C. Single colonies were picked and grown in Luria broth at 37° C. under antibiotic selection.

For protein expression experiments, transformed cells were grown in 96-well microtiter plates (MTPs) in cultivation medium (enriched semi-defined media based on MOPS buffer, with urea as major nitrogen source, glucose as the main carbon source, supplemented with 1% soytone for robust cell growth, containing antibiotic selection) for 3 days at 32° C., 300 rpm, with 80% humidity in a shaking incubator. After centrifugation and filtration, clarified culture supernatants containing the proteases of interest were used for assays.

Example 2

Assays

Protein Determination

The concentration of the BG46 subtilisin variants in culture supernatant was determined by UHPLC using a Zorbax 300 SB-C3 column and linear gradient of 0.1% Trifluoroacetic acid (Solution A) and 0.07% Trifluoroacetic acid in Acetonitrile (Solution B) and detection at 220 nm. Culture supernatants were diluted in 10 mM NaCl, 0.1 mM $CaCl_2$, 0.005% Tween®-80 for loading onto column. The protein concentration of the samples was calculated using a standard curve of the purified parent enzyme.

Protease Activity

The protease activity of BG46 subtilisin variants was tested by measuring the hydrolysis of AAPF-pNA synthetic peptidic substrate.

For the AAPF assay, the reagent solutions used were: 100 mM Tris pH 8.6, 10 mM $CalCl_2$, 0.005% Tween®-80 (Tris/Ca buffer) and 160 mM suc-AAPF-pNA in DMSO (suc-AAPF-pNA stock solution) (Sigma: S-7388). To prepare a working solution, 1 mL suc-AAPF-pNA stock solution was added to 100 mL Tris/Ca buffer and mixed. An enzyme sample was added to a microtiter plate (MTP) containing 1 mg/mL suc-AAPF-pNA working solution and assayed for activity at 405 nm over 3-5 min using a SpectraMax plate reader in kinetic mode at room temperature (RT). The protease activity was expressed as mOD/min.

Stability Assay in Tris-EDTA

The stability of the BG46 subtilisin variants described herein was measured by diluting the variants in stress buffer and measuring the proteolytic activity of the variants before and after a heat incubation step using the AAPF assay described above. The temperature and duration of the heat incubation step were chosen such that the reference protease showed ~15-30% residual activity. Samples were incubated at 60° C. for 5 min in a 384-well thermocycler. Stability was measured in Tris-EDTA (50 mM Tris pH 9; 5 mM EDTA; 0.005% Tween®-80) buffered condition. Stability results were calculated as the percent (%) of remaining activity for each enzyme sample by taking the ratio of mOD/min for stressed over unstressed condition and multiplying by 100.

Example 3

Illustrative Example

Gel Phase Composition

| | Mass % |
|---|---|
| Enzyme granule (protease), based on active protein content | 0.01-7.5 |
| Enzyme granule (amylase), based on active protein content | 0-5.0 |
| Water soluble zinc salt | 0.1-2.4 |
| Glycerine | 10-50 |
| Propanediol | 10-50 |
| Dispersant polymer | 0-30 |
| Non-ionic surfactant | 0-40 |
| Polyethylene glycol | 8-26 |
| PVOH | 8-22 |
| BTA | 0.01-5 |
| Process aids | 0-10 |
| Dye solution | 0-1.5 |
| Miscellaneous, other active substances, organic solvents, perfume | Balance to 100 |

Solid Phase Composition

| | Mass % |
|---|---|
| Citrate, Na salt | 10-60 |
| Phosphate | 0-10 |
| MGDA, Na salt | 0-50 |
| Disilicate, Na salt | 5-40 |
| Sodium carbonate | 10-50 |
| Silver protection | 0.0-1.0 |
| Sodium percarbonate | 5-20 |
| Bleach catalyst | 0.02-0.5 |

-continued

| | Mass % |
|---|---|
| Bleach activator | 1-5 |
| Non-ionic surfactants | 2.5-10 |
| Polycarboxylate | 4-10 |
| Cationic copolymer | 0-0.75 |
| Disintegrant | 0-1.5 |
| Protease | 1.5-5 |
| Amylase | 0.5-3 |
| Perfume | 0.05-0.25 |
| Dye solution | 0.0-1 |
| Zn salt | 0.1-0.3 |
| Sodium sulfate | 0.0-10 |
| Water | 0-10 |
| pH control | 0-1.5 |
| Process aids | 0-5 |

The solid and gel phases can be combined as desired. The spatial configuration of the gel phase, which is liquid after mixing of the ingredients and dimensionally stable within a setting time of a maximum of 10 minutes, can be predetermined by the spatial configuration of the solid phase and by molds that are commercially available or self-designed. A water-soluble wrapping in the form of an open pouch can be produced by deep-drawing a PVOH-containing film. A liquid composition can be poured into said open cavity and result in the gel phase after curing, then solid phases in the form of a free-flowing solid can be poured into a pouch comprising polyvinyl alcohol. 1.0 g of the liquid non-ionic surfactant Genapol EC 50 can be metered onto the resulting particulate surface. The proportion of non-ionic surfactants can be increased significantly without changing other phases. The open pouch can be sealed by applying a second film and sealing by heat sealing. The cleaning agent portions prepared can be characterized by appealing aesthetics.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any composition disclosed or claimed herein or that it alone, or in any combination with any other reference or references, teaches, suggests or discloses any such composition. Further, to the extent that any meaning or definition of a term in this document conflicts with any meaning or definition of the same term in a document incorporated by reference, the meaning or definition assigned to that term in this document shall govern.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

SEQUENCE LISTING

```
Sequence total quantity: 3
SEQ ID NO: 1            moltype = AA  length = 269
FEATURE                 Location/Qualifiers
source                  1..269
                        mol_type = protein
                        organism = Bacillus gibsonii
SEQUENCE: 1
QQTVPWGITR VQAPAVHNRG ITGSGVRVAI LDSGISAHSD LNIRGGASFV PGEPTTADLN  60
GHGTHVAGTV AALNNSIGVI GVAPNAELYA VKVLGANGSG SVSGIAQGLE WAATNNMHIA  120
NMSLGSDFPS STLERAVNYA TSRDVLVIAA TGNNGSGSVG YPARYANAMA VGATDQNNRR  180
ANFSQYGTGI DIVAPGVNVQ STYPGNRYVS MNGTSMATPH VAGAAALVKQ RYPSWNATQI  240
RNHLKNTATN LGNSSQFGSG LVNAEAATR                                  269

SEQ ID NO: 2            moltype = AA  length = 269
FEATURE                 Location/Qualifiers
source                  1..269
                        mol_type = protein
                        organism = Bacillus gibsonii
SEQUENCE: 2
QQTVPWGITR VQAPAVHNRG ITGSGVRVAI LDSGISAHED LNIRGGASFV PGEPTTADLN  60
GHGTHVAGTV AALNNSIGVI GVAPNAELYA VKVLGANGRG SVSGIAQGLE WAATNNMHIA  120
NMSLGAEGPS STLERAVNYA TSRDVLVIAA TGNNGSGSVG YPARYANAMA VGATDQNNRR  180
ANFSQYGTGI DIVAPGVNVQ STYPGNRYVS MNGTSMATPH VAGAAALVKQ RYPSWNATQI  240
RNHLKNTATN LGNSSQFGSG LVNAEAATR                                  269

SEQ ID NO: 3            moltype = AA  length = 484
FEATURE                 Location/Qualifiers
REGION                  1..484
                        note = Synthetic construct
source                  1..484
                        mol_type = protein
                        organism = synthetic construct
SEQUENCE: 3
HHNGTNGTMM QYFEWHLPND GQHWNRLRND AANLKNLGIN AVWIPPAWKG TSQNDVGYGA  60
YDLYDLGEFN QKGTIRTKYG TRSQLQSAIA RLQNNGIQVF GDVVMNHKGG ADGTERVQAV  120
EVNPSNRNQE VTGEYTIEAW TKFDFPGRGN THSSFKWRWY HFDGTDWDQS RNLNNRIYKF  180
TGKAWDWEVD TENGNYDYLM YADVDMDHPE VINELRRWGV WYTNTLNLDG FRIDAVKHIK  240
YQFTRDWLNH VRSTTGKNNM FAVAEFWKND LGAIENYLSK TNWNHSVFDV PLHYNLYNAS  300
KSGGNYDMRQ ILNGTVVSKH PIHAVTFVDN HDSQPAEALE SFVEAWFKPL AYALILTREQ  360
GYPSVFYGDY YGIPTHGVAA MKGKIDPILE ARQKYAYGTQ HDYLDHHNII GWTREGNSAH  420
PNSGLATIMS DGPGGSKWMY VGRHKAGQVW RDITGNRTGT VTINADGWGN FSVNGGSVSI  480
WVNK                                                             484
```

What is claimed is:

1. An automatic dishwashing composition comprising a surfactant and a protease, wherein the automatic dishwashing composition is in the form of a water-soluble unit-dose pouch comprising a compartment, wherein the compartment comprises both a powder component and a gel component, and wherein the protease comprises a subtilisin variant that comprises:

(i) a mutation at position 122; and (ii) one or more mutations at positions 126, 127, 128, 211 and 212, with reference to SEQ ID NO: 1, wherein the subtilisin variant has 88% or more identity to the amino acid sequence of SEQ ID NO: 1.

2. The composition according to claim 1, wherein the composition is in the form of a multi-compartment pouch that comprises two or more compartments.

3. The composition according to claim 1, wherein the protease is present in the gel component.

4. The composition according to claim 1, further comprising a bleach, wherein the bleach is present in the powder component.

5. The composition according to claim 1, wherein the subtilisin variant comprises:

(i) the mutation at position M122L; and (ii) one or more mutations at positions 126, 127, 128, 211 and 212.

6. The composition according to claim 1, wherein the subtilisin variant comprises two or more mutations at positions 126, 127, 128, 211 and 212.

7. The composition according to claim 1, wherein the subtilisin variant comprises one or more mutations selected from S126A, D127E, F128G, M211Q and N212Q.

8. The composition according to claim 1, wherein the subtilisin variant comprises the mutations M122L, S126A, D127E, F128G, M211Q and N212Q.

9. The composition according to claim 1, wherein the subtilisin variant comprises an amino acid sequence having 89% sequence identity to the amino acid sequence of SEQ ID NO: 1.

10. The composition according to claim 1, wherein the subtilisin variant is derived from a parent or reference polypeptide with at least 60% amino acid sequence identity to SEQ ID NO: 1.

11. The composition according to claim 1, wherein the composition further comprises a manganese bleach catalyst selected from the group consisting of 1,4,7-trimethyl-1,4,7-triazacyclononane (Me-TACN), 1,2, 4,7-tetramethyl-1,4,7-triazacyclononane (Me/Me-TACN), and mixtures thereof.

12. The composition according to claim 1, wherein the composition further comprises one or more other enzymes selected from acyl transferases, amylases, alpha-amylases, beta-amylases, alpha-galactosidases, arabinases, arabinosidases, aryl esterases, beta-galactosidases, beta-glucanases, carrageenases, catalases, cellulases, chondroitinases, cutinases, dispersins, endo-glucanases, endo-beta-mannanases, exo-beta-mannanases, esterases, exo-mannanases, galactanases, glucoamylases, hemicellulases, hexosaminidase, hyaluronidases, keratinases, laccases, lactases, ligninases, lipases, lipolytic enzymes, lipoxygenases, lysozyme, metalloproteases, mannanases, nucleases, oxidases, oxidoreductases, pectate lyases, pectin acetyl esterases, pectinases, pentosanases, perhydrolases, peroxidases, PETases, phenoloxidases, phosphatases, phospholipases, phytases, polyesterases, polygalacturonases, additional proteases, pullulanases, reductases, rhamnogalacturonases, tannases, transglutaminases, xylan acetyl-esterases, xylanases, and xylosidases; and combinations thereof.

13. The composition according to claim 12, wherein the one or more enzymes comprises an amylase selected from the group consisting of AA707, AA560, AAI10, SP722, BspAmy24, and CspAmy1, variants thereof, and combinations thereof.

14. The composition according to claim 12, wherein the one or more enzymes comprises a recombinant, non-naturally-occurring variant of a parent alpha-amylase.

15. The composition according to claim 1, wherein the subtilisin variant comprises an amino acid sequence having 89% or more sequence identity to the amino acid sequence of SEQ ID NO: 1.

16. The composition according to claim 1, wherein the subtilisin variant comprises an amino acid sequence having 90% sequence identity to the amino acid sequence of SEQ ID NO: 1.

17. The composition according to claim 1, wherein the subtilisin variant comprises an amino acid sequence having 90% or more sequence identity to the amino acid sequence of SEQ ID NO: 1.

* * * * *